United States Patent
Ioffe et al.

(10) Patent No.: US 12,231,222 B2
(45) Date of Patent: Feb. 18, 2025

(54) METHODS FOR CONFORMING NON-TERRESTRIAL NETWORK COMMUNICATION TO TERRESTRIAL STANDARDS AND REGULATIONS

(71) Applicant: Apple Inc., Cupertino, CA (US)

(72) Inventors: Anatoliy S Ioffe, Sunnyvale, CA (US); Elmar Wagner, Taufkirchen (DE); Daniel Popp, Munich (DE); Fucheng Wang, Cupertino, CA (US); Camila Priale Olivares, Munich (DE); Alexander Sayenko, Munich (DE)

(73) Assignee: Apple Inc., Cupertino, CA (US)

( * ) Notice: Subject to any disclaimer, the term of this patent is extended or adjusted under 35 U.S.C. 154(b) by 411 days.

(21) Appl. No.: 17/716,852

(22) Filed: Apr. 8, 2022

(65) Prior Publication Data
US 2022/0345207 A1    Oct. 27, 2022

Related U.S. Application Data

(60) Provisional application No. 63/178,838, filed on Apr. 23, 2021.

(51) Int. Cl.
*H04B 7/185* (2006.01)
(52) U.S. Cl.
CPC ..... *H04B 7/18543* (2013.01); *H04B 7/18532* (2013.01)
(58) Field of Classification Search
None
See application file for complete search history.

(56) References Cited

U.S. PATENT DOCUMENTS

| 5,949,796 A | 9/1999 | Kumar |
|---|---|---|
| 6,246,698 B1 | 6/2001 | Kumar |

(Continued)

FOREIGN PATENT DOCUMENTS

| CN | 111492604 A | 8/2020 |
|---|---|---|
| CN | 112640330 A | 4/2021 |
| EP | 02141935 B1 | 9/2011 |

OTHER PUBLICATIONS

Guidotti A., et al.; "Architectures, standardisation, and procedures for 5G Satellite Communications: A survey"; Computer Networks, Elsevier, Amsterdam, NL; vol. 183, Oct. 7, 2020 (XP086387580); 18 pgs.

(Continued)

*Primary Examiner* — Shripal K Khajuria
(74) *Attorney, Agent, or Firm* — Fletcher Yoder, P.C.

(57) ABSTRACT

User equipment may configure a transmitter or receiver to conform to regulations or standards of a geographical region to communicate with non-terrestrial networks (e.g., satellite networks). In one embodiment, the user equipment may receive an indication of a regulation or standard to which to conform to from a terrestrial communication node, and apply an emission mask to the transmitter based on the regulation or standard. The user equipment may additionally or alternatively configure the receiver to be compliant with a noise level tolerance of a received signal specified by the regulation or standard. In some embodiments, the user equipment may implement a frequency offset between the received signal and an interfering signal associated with the noise level tolerance that is scaled at least on a channel bandwidth associated with the desired signal. Moreover, the user equipment may scale the noise level tolerance based on the frequency offset.

20 Claims, 20 Drawing Sheets

(56) References Cited

U.S. PATENT DOCUMENTS

| | | |
|---|---|---|
| 10,848,237 B1 | 11/2020 | Sorond et al. |
| 2017/0303274 A1* | 10/2017 | He .................. H04W 72/23 |
| 2017/0347340 A1* | 11/2017 | Haley ............ H04L 25/03343 |
| 2019/0254081 A1* | 8/2019 | Li .................... H04W 74/0841 |
| 2020/0228194 A1 | 7/2020 | Hussein et al. |
| 2021/0336707 A1 | 10/2021 | Chervyakov et al. |

OTHER PUBLICATIONS

Extended European Search Report for EPO Patent Application 22169147.0 dated Sep. 20, 2022; 10 pgs.
Solutions for NR to support non-terrestrial networks (NTN); Thales; 3GPP TSG RAN meeting #86; Dec. 9-13, 2019; Sitges, Spain.
Discussion on exemplary bands for NTN topic; Huawei, HiSilicon; 3GPP TSG-RAN WG4 Meeting # 98-e; Jan. 25-Feb. 5, 2021; Electronic Meeting.
Discussion on frequency bands and scenarios for NTN; CATT; 3GPP TSG-RAN WG4 Meeting #98-e; Jan. 25-Feb. 5, 2021; Electronic Meeting.
Exemplary bands for NTN; CMCC; 3GPP TSG-RAN WG4 Meeting # 98-e; Jan. 25-Feb. 5, 2021; Electronic Meeting.
Views on NTN exemplary bands; Samsung; 3GPP TSG-RAN WG4 Meeting #98e; Jan. 25-Feb. 5, 2021; Electronic Meeting.
Criteria for Choosing FR1 Exemplary Band; Thales; 3GPP TSG-RAN WG4 Meeting #98e; Jan. 25-Feb. 5, 2021; Electronic Meeting.
NTN: spectrum and regulatory aspects; Ericsson; 3GPP TSG-RAN WG4 Meeting #98e; Jan. 25-Feb. 5, 2021; Electronic Meeting.
Discussion on satellite bands outside FR1/FR2 range for NR based satellite networks; Hughes, Inmarsat, Thales, Intelsat, Fraunhofer, ESA; 3GPP TSG-RAN WG4 Meeting #98e; Jan. 25-Feb. 5, 2021; Electronic Meeting.
WF on [307] NTN_Solutions_Part1; Thales; 3GPP TSG-RAN WG4 Meeting #98b; Apr. 12-20, 2021; Electronic Meeting.
Rules & regulations for title 47. Federal Communications Commission. (Dec. 21, 2017). Retrieved Mar. 25, 2022, from https://www.fcc.gov/wireless/bureau-divisions/technologies-systems-and-innovation-division/rules-regulations-title-47.
Satellite Earth Stations and Systems (SES); Harmonised Standard for Mobile Earth Stations (MES), including handheld earth stations, for Satellite Personal Communications Networks (S-PCN) operating in the 1,6 GHz/2,4 GHZ frequency band under the Mobile Satellite Service (MSS) covering the essential requirements of article 3.2 of the Directive 2014/53/EU, ETSI; European Telecommunications Standards Institute 2016.

* cited by examiner

TABLE 7.6.4-1: NARROW BAND BLOCKING

| NR BAND | PARAMETER | UNIT | CHANNEL BANDWIDTH | | | | | | | | | | |
|---|---|---|---|---|---|---|---|---|---|---|---|---|---|
| | | | 5 MHZ | 10 MHZ | 15 MHZ | 20 MHZ | 25 MHZ | 30 MHZ | 40 MHZ | 50 MHZ | 60 MHZ | 80 MHZ | 90 MHZ | 100 MHZ |
| n1, n2, n3, n5, n7, n8, n12, n20, n25, n28, n34, n38, n39, n40, n41, n50, n51, n66, n70, n71, 1-n74, n75, n76 | $P_w$ | dBm | \multicolumn{12}{c}{$P_{REFSENS}$ + CHANNEL-BANDWIDTH SPECIFIC VALUE BELOW} |
| | | dBm | 16 | 13 | 14 | 16 | 16 | 16 | 16 | 16 | 16 | 16 | 16 | 16 |
| | $P_{uw}$ (CW) | dBm | -55 | -55 | -55 | -55 | -55 | -55 | -55 | -55 | -55 | -55 | -55 | -55 |
| | $F_{uw}$ (OFFSET SCS = 15kHz) | MHZ | 2.7075 | 5.2125 | 7.7025 | 10.2075 | 13.0275 | 15.6075 | 20.5575 | 25.7025 | NA | NA | NA | NA |
| | $F_{uw}$ (OFFSET SCS = 30kHz) | MHZ | NA | NA | NA | NA | NA | NA | NA | 25.7025 | 30.855 | 40.935 | 45.915 | 50.865 |

NOTE 1: THE TRANSMITTER SHALL BE A 4 dB BELOW $P_{CMAX\_L,F,C}$ AT THE MINIMUM UL CONFIGURATION SPECIFIED IN TABLE 7.3.2-3 WITH $P_{CMAX\_L,F,C}$ DEFINED IN CLAUSE 6.2.4.
NOTE 2: REFERENCE MEASUREMENT CHANNEL IS SPECIFIED IN ANNEXES A.3.3 WITH ONE SIDED DYNAMIC OCNG PATTERN OP.1 FDD/TDD AS DESCRIBED IN ANNEX A.5.1.1/A.5.2.1.
NOTE 3: THE $P_{REFSENS}$ POWER LEVEL IS SPECIFIED IN TABLE 7.3.2-1 AND TABLE 7.3.2-2 FOR TWO AND FOUR ANTENNA PORTS, RESPECTIVELY.

FIG. 18

METHODS FOR CONFORMING NON-TERRESTRIAL NETWORK COMMUNICATION TO TERRESTRIAL STANDARDS AND REGULATIONS

CROSS-REFERENCE TO RELATED APPLICATION

This application claims the benefit of U.S. Provisional Application No. 63/178,838, filed Apr. 23, 2021, which is hereby incorporated by reference in its entirety for all purposes.

BACKGROUND

The disclosure relates generally to wireless communication between user equipment (e.g., cell phones, tablets) and non-terrestrial networks (e.g., satellite networks). In particular, the user equipment may establish communication with and transfer data using the non-terrestrial networks using the 'L' frequency band (e.g., a 1.6 gigahertz (GHz) frequency band) and/or the 'S' frequency band (e.g., a 2 GHz frequency band). However, various regulatory and/or standards bodies in different geographical regions may define different respective regulations and/or standards governing communications (e.g., terrestrial communications) in these frequency bands.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, user equipment may include one or more antennas, receive circuitry coupled to the one or more antennas, and at least one processor communicatively coupled to the receive circuitry. The at least one processor may cause the receive circuitry to receive system information from a terrestrial communication node, determine that the system information includes a network signaling value that indicates a regional regulation or standard, cause the receive circuitry to conform to an adjacent channel selectivity condition of the regional regulation or standard, an in-band blocking condition of the regional regulation or standard, or both, and cause the receive circuitry that may conform the adjacent channel selectivity condition of the regional regulation or standard, the in-band blocking condition of the regional regulation or standard, or both, to receive data from a non-terrestrial communication node.

In another embodiment, a method may include detecting, via a receiver of user equipment, a terrestrial communication node, synchronizing, via at least one processor of the user equipment, to the terrestrial communication node, causing, via the at least one processor, the receiver to receive system information facilitating communication with a non-terrestrial communication node from the terrestrial communication node, causing, via the at least one processor, the receiver to have less than or equal a threshold power of performance degradation when receiver a signal on a channel having a bandwidth and a center frequency, and an interfering signal having a power level is present at a first frequency that is a bandwidth greater than the center frequency, and receiving, using the receiver, data from the non-terrestrial communication node.

In yet another embodiment, a communication node may include one or more antennas, a receiver coupled to the one or more antennas, a transmitter coupled to the one or more antennas, and one or more processors communicatively coupled to the transmitter and the receiver. The one or more processors may cause the transmitter and the receiver to detect user equipment, synchronize to the user equipment, receiver, via the receiver, a request from the user equipment for an uplink frequency channel, a downlink frequency channel, or both, to communicate with a non-terrestrial communication node, and transmit, based on the request, system information to the user equipment, the system information including at least a network signaling value indicating a regional regulation or standard associated with communicating with the non-terrestrial communication node, wherein transmitting the system information comprising at least the network signaling value causes an additional one or more processors of the user equipment to cause an additional receiver of the user equipment to conform to an in-band blocking condition of the regional regulation or standard.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 18 is a table illustrating threshold power of performance degradation for different channel bandwidths that may be used in different narrowband blocking schemes (e.g., as shown in FIG. 17 and FIG. 20);

DETAILED DESCRIPTION OF SPECIFIC EMBODIMENTS

Figure 1:
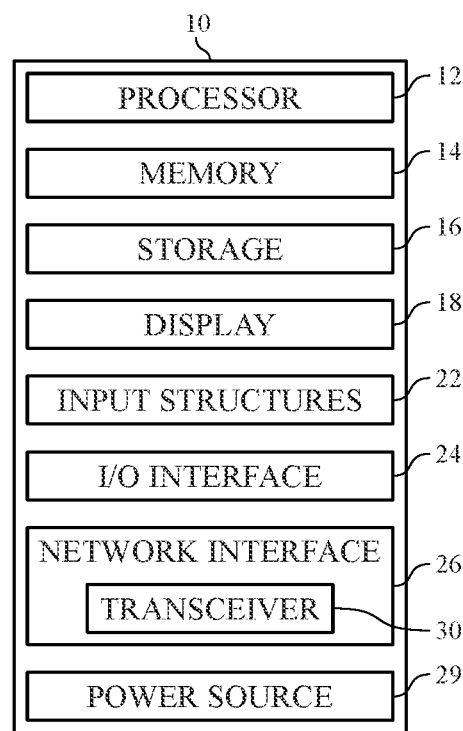
FIG. 1 is a block diagram of an electronic device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

Various governmental regulatory or standards entities—such as the Federal Communications Commission (FCC) of the United States, the European Telecommunications Standards Institute (ETSI) in Europe, the Ministry of Industry and Information Technology (MIIT) of China, the Third Generation Partnership Project (3GPP)—provide regulations or standards (e.g., radio frequency emission regulations or standards) for radio frequency communication on certain frequency ranges or bands. For device manufacturers to market communication devices or "user equipment" (e.g., radio frequency communication devices such as mobile communication devices, smartphones, tablets, wearable devices, and so on) in a region, the manufacturers may conform the user equipment to the regulations/standards of that region.

However, there may be differences between the various regulatory and/or standards schemes around the world. For example, for the 'L' frequency band (e.g., a 1.6 gigahertz (GHz) frequency band) and the 'S' frequency band (e.g., a 2 GHz frequency band), the FCC has defined an out-of-channel emission mask (e.g., to maintain transmission power in neighboring frequency ranges outside of a channel of a transmitted signal below certain thresholds) for user equipment, but has defined no regulations for reception by the user equipment. ETSI, however, for the same frequency bands, has defined out-of-band (e.g., to maintain transmission power in neighboring frequency ranges outside of a band of a transmitted signal below certain thresholds) and out-of-channel emission masks more stringent than those defined by the FCC, as well as having defined standards for reception by the user equipment. Thus, user equipment sold and/or used in a region governed by the ETSI standards may conform to more stringent emission and reception standards. User equipment sold and/or used in a region governed by the FCC regulations may conform to less stringent emission regulations/standards, and may not conform to any reception regulations/standards.

Accordingly, user equipment conforming to FCC regulations may not operate in a region governed by ETSI, as it may not conform to the more stringent emission and reception standards imposed by ETSI. On the other hand, user equipment conforming to ETSI standards may operate less efficiently (e.g., with less transmission and reception capability) in a region governed by the FCC, as the user equipment may operate under the FCC regulations instead of the ETSI standards. While this problem may not be experienced by many terrestrial network users, communicating with non-terrestrial networks may often be associated with moving from geographical region to geographical region, each possibly governed by different regulatory and/or standards bodies. Accordingly, if the user equipment is conformed to one regulation or standard, and is moved to a geographical region governed by another regulation or standard to communicate with a non-terrestrial network, the user equipment may operate inefficiently, or even be incapable of operation.

Additionally, as defined by the ETSI standards, an in-band or narrowband blocking specification (e.g., for the L and S bands) results in a channel having a bandwidth of less than 10 megahertz. That is, ETSI regulates a noise level of a received signal on the channel to not exceed a threshold when there is an interfering signal 5 megahertz less than the center frequency and 5 megahertz greater than the center frequency. Expanding the channel bandwidth to greater than or equal to 10 megahertz may enable greater data throughput, but it may be desired to maintain the noise level tolerance below a threshold to ensure sufficient communication quality.

The present disclosure provides techniques to adjust user equipment transmitter and/or receiver configuration to conform to the regulations or standards of the region in which it is located to communicate with non-terrestrial networks (e.g., satellite networks). Communicating with non-terrestrial networks, in particular, may often include doing so from different geographical regions governed by different regulatory and/or standards bodies. Adjusting the user equipment transmitter and/or receiver configuration may increase communication efficiency, and even enable operation of the user equipment) in the different geographical regions as the user equipment may be dynamically set to a more efficient or permissible configuration with respect to non-terrestrial transmission and reception (e.g., when it is determined under which regulations or standards the user equipment is to operate). In some embodiments, the configuration of the user equipment may be set to operate under less stringent regulations or standards (e.g., FCC regulations) by default, and adjust to a less efficient configuration (e.g., ETSI standards) if it is determined that the user equipment should operate under more stringent regulations or standards.

As mentioned above, for transmission over certain frequency band (e.g., the L and S bands), the FCC has defined an out-of-channel emission mask (e.g., to maintain transmission power in neighboring frequency ranges outside of a channel of a transmitted signal below certain thresholds) for user equipment. ETSI, however, for the same frequency bands, has defined out-of-band (e.g., to maintain transmission power in neighboring frequency ranges outside of a band of a transmitted signal below certain thresholds) and out-of-channel emission masks more stringent than those defined by the FCC. In some embodiments, a terrestrial network communication node (e.g., a communication node, such as a base station, that enables communication with a non-terrestrial communication hub, such as a satellite, via a non-terrestrial network) may indicate a regulation or standard to which the user equipment is to conform. The user equipment may store multiple transmitter configurations corresponding to multiple emission masks that conform with multiple regional regulations/standards. Upon receiving the indication, the user equipment may apply an emission mask to a transmitter of the user equipment that conforms to the regulation or standard indicated by the non-terrestrial network communication node, and transmit data to the non-terrestrial network using the configured transmitter. That is, if the indication indicates the FCC regulation, then the user equipment may apply an out-of-channel emission mask compliant with the FCC regulation to the transmitter. If the indication indicates the ETSI standard, then the user equipment may apply an out-of-channel and out-of-band emission mask compliant with the ETSI standard to the transmitter.

Moreover, certain regulations may govern reception, e.g., over the L and S bands. For example, ETSI regulates a noise level tolerance of a received signal on a channel having a center frequency and a bandwidth by ensuring that a noise level of the received signal does not exceed a first threshold when there is an interfering signal at a frequency the bandwidth of the channel away from the center frequency, and that noise level of the received signal does not exceed a second threshold when there are interfering signals 5 megahertz away from the center frequency. However, FCC has no such regulation for reception over the L and S bands. Accordingly, in some embodiments, a terrestrial communication node may indicate a regulation or standard to which the user equipment is to conform. The user equipment may store multiple receiver configurations that conform to multiple regional regulations or standards. Upon receiving the indication, the user equipment may apply the receiver that conforms to the regulation or standard indicated by the terrestrial communication node, and receive data from the non-terrestrial network using the configured receiver. That is, if the indication indicates the ETSI standard, then the user equipment may configure the receiver to be compliant with the noise level tolerance specified by the ETSI standard. If the indication indicates the FCC regulation, then the user equipment may not configure the receiver to be compliant with the noise level tolerance specified by the ETSI standard.

These regulations or standards may define a fixed frequency offset between a desired signal and an interfering signal (e.g., an unwanted signal in an adjacent or nearby frequency channel with the potential to interfere with the desired signal). This fixed frequency offset may limit the range of channel bandwidths that may be used. For example, if the frequency offset is fixed by regulation or standard at 5 MHz from a center frequency ($f_c$) of a signal, a signal with a bandwidth of 5 MHz may be sufficiently separated from the interfering signal so as to receive little interference from the interfering signal. However, if the signal were to have a bandwidth of 10 MHz, there may be substantial interference caused by the proximity between the edges of the desired signal and the interfering signals.

As such, the present disclosure provides techniques for enabling a frequency offset between the desired signal and the interfering signals that may be scaled depending on the channel bandwidth associated with the desired signal. By enabling channel-bandwidth-dependent scaling, a larger range of channel bandwidths may be utilized by user equipment, which may result in higher throughput and a more flexible range of signal data rates.

As noted above, as defined by the ETSI standards, an in-band or narrowband blocking specification (e.g., for the L and S bands) results in a channel having a bandwidth of less than 10 megahertz (MHz) due to ETSI standards ensuring that a noise level of a received signal on the channel does not exceed a threshold when there is an interfering signal 5 MHz less than the center frequency and 5 MHz greater than the center frequency. To expand a channel bandwidth (e.g., in the L and S bands) to greater than or equal to 10 MHz while maintaining the noise level of the received signal below a threshold to ensure sufficient communication quality, in some embodiments, the interfering signal may be located at a frequency that is dependent on (e.g., scaled based on) the channel bandwidth (e.g., as opposed to the fixed 5 MHz frequency offset). In additional or alternative embodiments, other factors in addition to the channel bandwidth may be used to determine frequency of the interfering signal while maintaining the noise level of the received signal below a threshold to ensure sufficient communication quality. For example, the interfering signal may be located at a frequency that is dependent on the channel bandwidth, a subcarrier spacing of the channel, and/or a fixed frequency offset. As another example, the interfering signal may be located at a frequency in another channel that is dependent on the channel bandwidth, a subcarrier spacing of the channel, and/or a number of resource blocks of the other channel. By enabling channel bandwidth (among other possible factors) dependent scaling of the interfering signal, a larger range of channel bandwidths may be realized, which may result in higher throughput and a more flexible range of signal data rates for the user equipment.

Additionally, regulations or standards may define the threshold for which the noise level of a received signal is not to exceed. For example, as mentioned above, the ETSI standards ensuring that a noise level of a received signal on the channel (e.g., having a bandwidth of 5 MHz) does not exceed a threshold (e.g., of 1 decibel milliwatt) when there are interfering signals present at 5 MHz less than the center frequency and at 5 MHz greater than the center frequency. The threshold of 1 decibel milliwatt may be determined based on how far (e.g., in frequency) the interfering signal is offset from the channel, as the closer the interfering signal is to the channel (e.g., the smaller the offset), the greater the effect of interference from the interfering signal on the channel. That is, the threshold varies inversely with the frequency that the interfering signal is offset from the received signal. Moreover, because the offset frequency may vary directly with the channel bandwidth, the threshold may also vary directly with the channel bandwidth. Accordingly, in embodiments where the interfering signal is closer in frequency to the received signal/channel, the threshold may be relaxed (e.g., increased) due to the greater effect of interference by the interfering signal. In embodiments where the interfering signal is farther in frequency from the received signal/channel, the threshold may be decreased due to the lesser effect of interference by the interfering signal. For example, when compared to the ETSI standard of using a channel bandwidth of 5 MHz and a threshold of 1 decibel milliwatt, if the channel bandwidth is less than 5 MHz, then the presently disclosed embodiments may enable the threshold to be greater than 1 decibel milliwatt (due to the interfering signal being closer to the received signal). On the other hand, if the channel bandwidth is greater than 5 MHZ, then the presently disclosed embodiments may enable the threshold to be less than 1 decibel milliwatt (due to the interfering signal being closer to the received signal). As such, the present disclosure provides techniques for scaling the noise tolerance of a received signal based on a frequency that an interfering signal is offset from the received signal.

While the present disclosure references conforming user equipment to different regulations or standards of certain regulatory or standards bodies (e.g., ETSI, FCC, 3GPP) for certain frequency bands (e.g., the L band, the S band) for non-terrestrial network communication, it should be understood that the disclosed embodiments may also apply to regulations or standards of any suitable regulatory or standards body, for any suitable frequency band or range, and/or for any suitable type of communication (e.g., terrestrial communication—such as communications using a cellular network between two user equipment on the Earth).

With the foregoing in mind, FIG. 1 is a block diagram of an electronic device 10, according to an embodiment of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a computer-readable medium) or a combination of both hardware and software elements. The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may represent a block diagram of any suitable computing device, including a desktop computer, a notebook computer, a portable electronic or handheld electronic device (e.g., a wireless electronic device or smartphone), a tablet, a wearable electronic device, and other similar devices. In particular, the electronic device 10 may include user equipment or radio frequency communication devices, such as mobile communication devices, smartphones, tablets, wearable devices, and so on. In some embodiments, the electronic device 10 may include (or may be included in) any suitable communication hub or node, such as a terrestrial communication hub or node, a non-terrestrial communication hub or node, a base station, or a network operator. It should be noted that the processor 12 and other related items in FIG. 1 may be generally referred to herein as "data processing circuitry." Such data processing circuitry may be embodied wholly or in part as software, hardware, or a combination thereof. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein and below.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, and/or for a non-terrestrial network, such as a satellite communication network. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas (not shown in FIG. 1). The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

Figure 2:
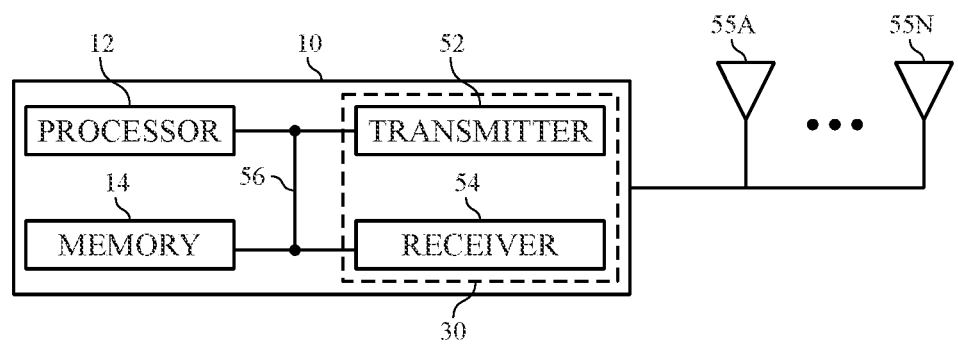
FIG. 2 is a functional block diagram of the electronic device of FIG. 1, according to embodiments of the present disclosure.

FIG. 2 is a functional block diagram of the electronic device 10 of FIG. 1, according to embodiments of the present disclosure. As illustrated, the processor 12, the memory 14, the transceiver 30, the transmitter 52, the receiver 54, and/or the antennas 55 (illustrated as 55A-55N) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and a remote location via, for example, a network or direct connection associated with the electronic device 10 and an external transceiver (e.g., in the form of a cell, eNB (E-UTRAN Node B or Evolved Node B), or gNB (Next Generation NodeB or gNodeB)), base stations, a non-terrestrial network, a satellite, and the like. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include (not shown) multiple transmitters, multiple receivers, multiple transceivers, and/or multiple antennas as needed for various communication standards.

The transmitter 52 may wirelessly transmit packets having different packet types or functions. For example, the transmitter 52 may transmit packets of different types generated by the processor 12. The receiver 54 may wirelessly receive packets having different packet types. In some examples, the receiver 54 may detect a type of a packet used and to process the packet accordingly. In some embodiments, the transmitter 52 and the receiver 54 may transmit and receive information via other wired or wireline systems or devices.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
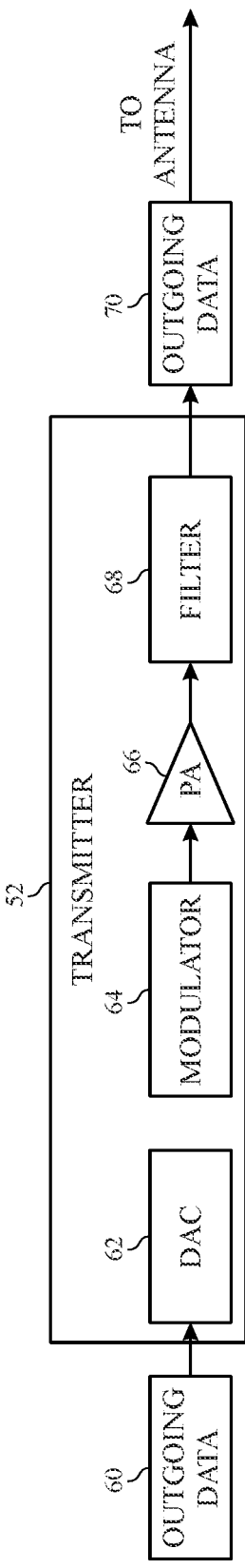
FIG. 3 is a schematic diagram of a transmitter of the electronic device of FIG. 1, according to an embodiment of the present disclosure.

FIG. 3 is a schematic diagram of the transmitter 52 (e.g., transmit circuitry), according to an embodiment of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives signal the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
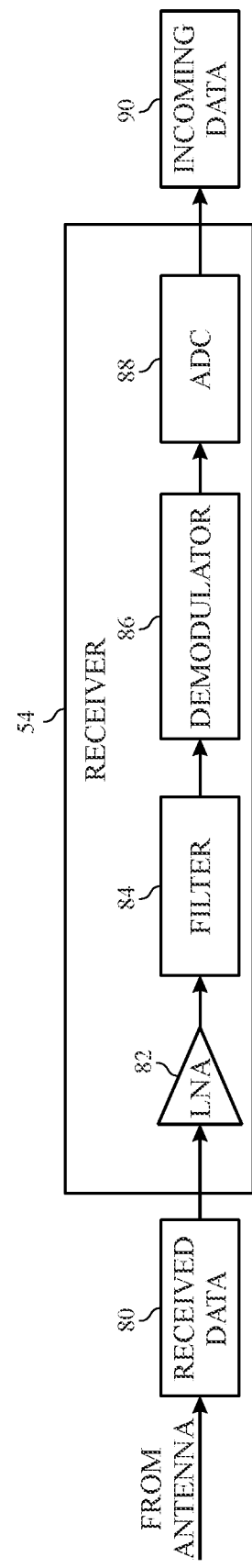
FIG. 4 is a schematic diagram of a receiver of the electronic device of FIG. 1, according to an embodiment of the present disclosure.

FIG. 4 is a schematic diagram of the receiver 54 (e.g., receive circuitry), according to an embodiment of the present disclosure. As illustrated, the receiver 54 may receive received data 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 which are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the electronic device 10. Additionally, the receiver 54 may include any suitable additional components not shown, or may not include certain of the illustrated components, such that the receiver 54 may receive the received data 80 via the one or more antennas 55. For example, the receiver 54 may include a mixer and/or a digital down converter.

Figure 5:
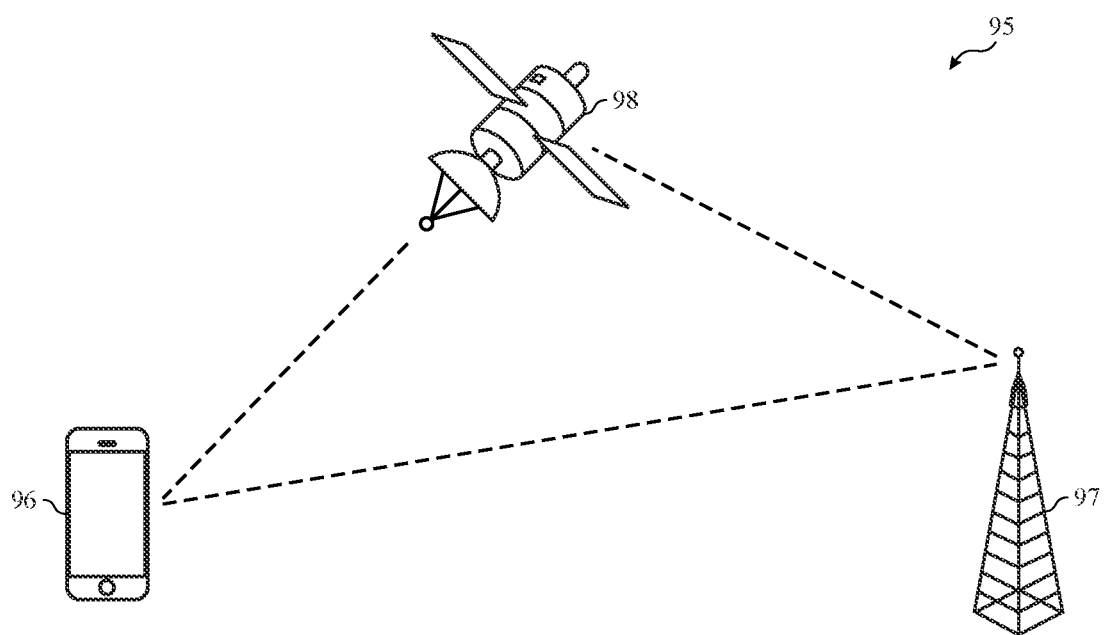
FIG. 5 is a diagram of a communicative relationship between user equipment, a terrestrial communication hub, and a non-terrestrial communication hub, according to an embodiment of the present disclosure.

FIG. 5 is a diagram 95 illustrating the communicative relationship between user equipment 96, a terrestrial communication node 97, and a non-terrestrial communication node 98. The terrestrial communication node 97 may include a base station, such as a base station that provides 5G/New Radio (NR) coverage (e.g., a Next Generation NodeB (gNodeB or gNB) base station) and enables communication to a non-terrestrial network. The user equipment 96 and the terrestrial communication node 97 may include at least some of the components of the electronic device 10 shown in FIGS. 1 and 2, including the transmitter 52, the receiver 54, and the associated circuitry shown in FIGS. 3 and 4. The user equipment 96 may communicate with the terrestrial communication node 97 to establish a communication link to the non-terrestrial communication node 98. For example, the user equipment 96 may send a request (e.g., via the processor 12) to the terrestrial communication node 97 seeking an available uplink frequency channel and/or an available downlink frequency channel to establish communications with the non-terrestrial communication node 98. These channels may be within the L frequency band (e.g., a 1.6 gigahertz (GHz) frequency band) and/or the S frequency band (e.g., a 2 GHz frequency band) that may be used for communication with satellites such as the non-terrestrial communication node 98. For example, the 1610-1626.5 megahertz (MHz), the 1626.5-1660.5 MHz, and 1668-1675 MHz sub-bands of the L band and the 1980-2010 MHz sub-band of the S band may be used by the user equipment 96 for uplink or transmitting data to the non-terrestrial communication node 98, and the 1518-1559 MHz and the 1613.8-1626.5 MHz sub-bands of the L band and the 2170-2200 MHz and 2483.5-2500 MHz sub-bands of the S band may be used by the user equipment 96 for downlink or receiving data from the non-terrestrial communication node 98.

As used herein, a NTN may include a satellite network, a HAPS (high altitude platform system, high altitude platform station, and/or high altitude pseudo-satellite) network, an air-to-ground network, and so on. Additionally, a non-terrestrial communication hub may include any airborne or spaceborne object that has been intentionally placed into orbit, such as a conventional spaceborne orbital satellite having a geostationary or geosynchronous orbit (GEO) at approximately 36,000 kilometers, medium-Earth orbit (MEO) at approximately 7,000 kilometers to 20,000 kilometers, or low-Earth orbit (LEO) at approximately 300 meters to 1,500 kilometers. In additional or alternative embodiments, the non-terrestrial communication hub may include any airborne device or vehicle or atmospheric satellite, such as balloon satellites, manned aircraft (e.g., an airplane, an airship, or any other aircraft), unmanned aircraft systems (UASs), HAPS, and so on. Further, the non-terrestrial communication hub may include a network or constellation of any of the non-terrestrial vehicles, devices, and/or satellites above.

Figure 6:
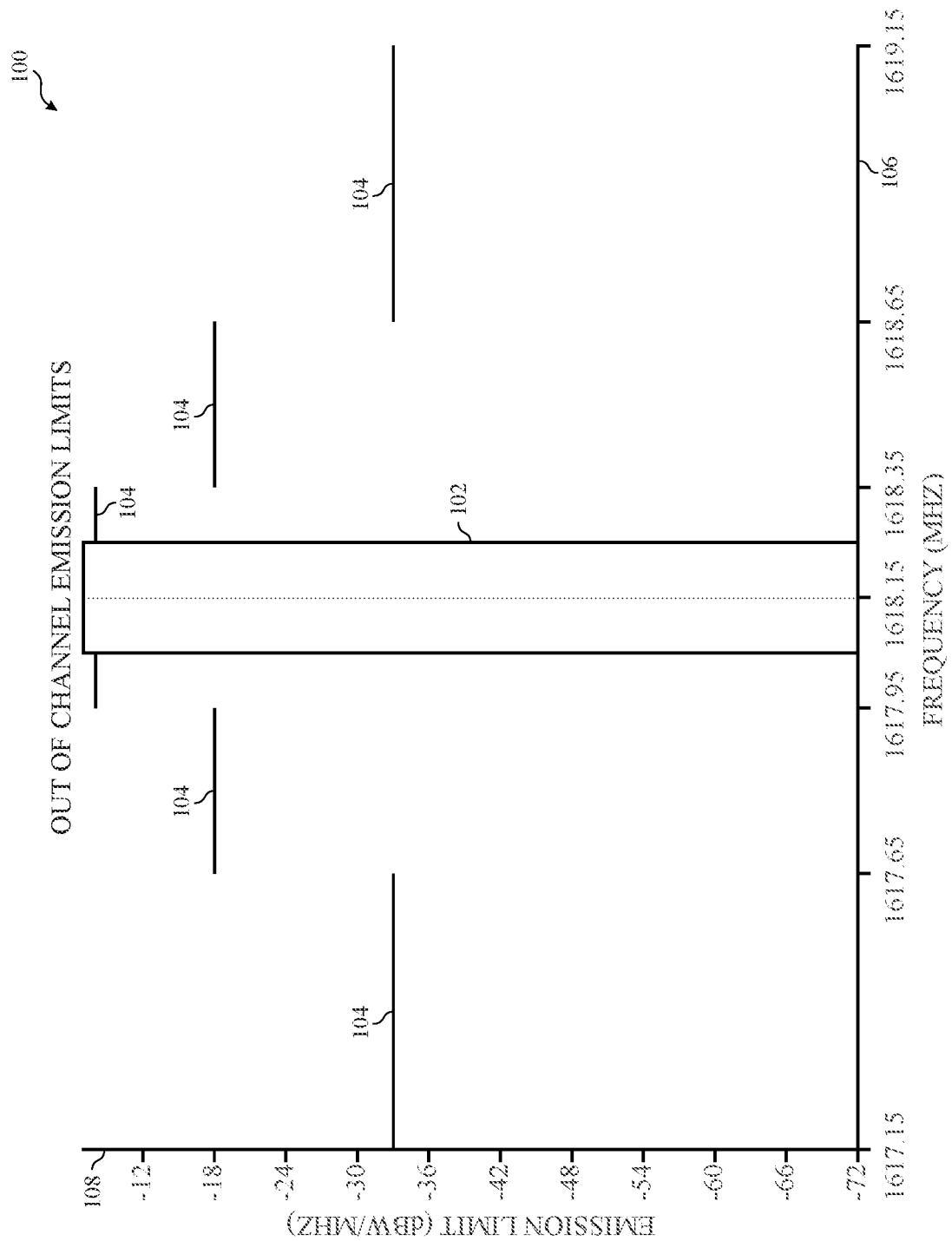
FIG. 6 is a graphical representation of an out-of-channel emission mask conforming to Federal Communication Commission (FCC) regulations that may be applied to or implemented on the transmitter of FIG. 3, according to an embodiment of the present disclosure.

FIG. 6 is a graphical representation of an FCC regulation 100 for an out-of-channel emission mask that may be applied to or implemented on the transmitter 52 of FIG. 3, according to embodiments of the present disclosure. An emission mask or spectrum emission mask (SEM) is a relative measurement of emission power outside of a target frequency range to transmission power of a signal transmitted in the target frequency range. For example, a regulatory or standards entity (e.g., the FCC) may define one or more threshold powers and one or more corresponding frequency ranges for which emissions caused by the transmitter 52 may not exceed. The emission mask 104 may thus contain or limit leakage of the transmitted signal in the channel 102 into other frequency ranges, channels, and/or bands, as such leakage may interfere with signals in the other frequency ranges, channels, or bands.

The horizontal axis 106 in FIG. 6 represents frequency (measured in MHz), and the vertical axis 108 represents power (measured in decibel milliwatts (dBm)/MHz). An emission mask may indicate one or more emission thresholds for one or more corresponding ranges of frequencies (e.g., outside of a target frequency range, such as a target band or channel). That is, the emission mask may provide upper limits of signal power (e.g., caused or leaking from the transmitted channel 102) that may be permitted to leak into the corresponding frequency ranges (e.g., nearby frequency channels or bands). As illustrated the emission mask 104 provides one or more emission thresholds for one or more corresponding range of frequencies outside of a target channel, such as the channel 102 centered at 1618.15 MHz. In particular, the out-of-channel emission mask 104 dictates that signal leakage resulting from the transmitted channel 102 in the frequency range between 1617.65 MHz to 1617.95 MHz cannot exceed a threshold of −18 dBm/MHz. Thus, any signal leakage in that frequency range may be tolerated below −18 dBm/MHz, but the transmitter 52 equipped with the emission mask 104 conforming to the FCC regulations may not emit a leakage signal in the frequency range above −18 dBm/MHz. Signal leakage may be caused by several factors, such as nonlinearities (e.g., a change in the performance due to a change in ambient temperature, real world manufacturing implications, manufacturing defects, non-ideal components) in the electronic device 10. To address signal leakage, the user equipment 96 may include a configuration for the transmitter 52 to contain or limit out-of-band emissions (or, for out-of-channel emission masks, out-of-channel emissions) within one or more threshold powers for one or more frequency ranges. To implement or apply an emission mask (e.g., the emission mask 104), the processor 12 may utilize a number of techniques, such as power backoff (e.g., reducing transmission power) and/or frequency filtering (e.g., using the filter 68).

As previously discussed, the user equipment 96 may be configured so as to conform to regulations or standards defined by a regulatory or standards entity, and the regulations/standards may change as the user equipment 96 moves from one geographical region to another. For example, in the discussion of FIG. 6 above, the regulations were defined by the FCC. However, if the user equipment 96 were to be moved outside of the United States to another region (e.g., to Europe), the user equipment 96 may be reconfigured to conform to the regulations or standards of the other region (e.g., standards defined by ETSI).

Figure 7:
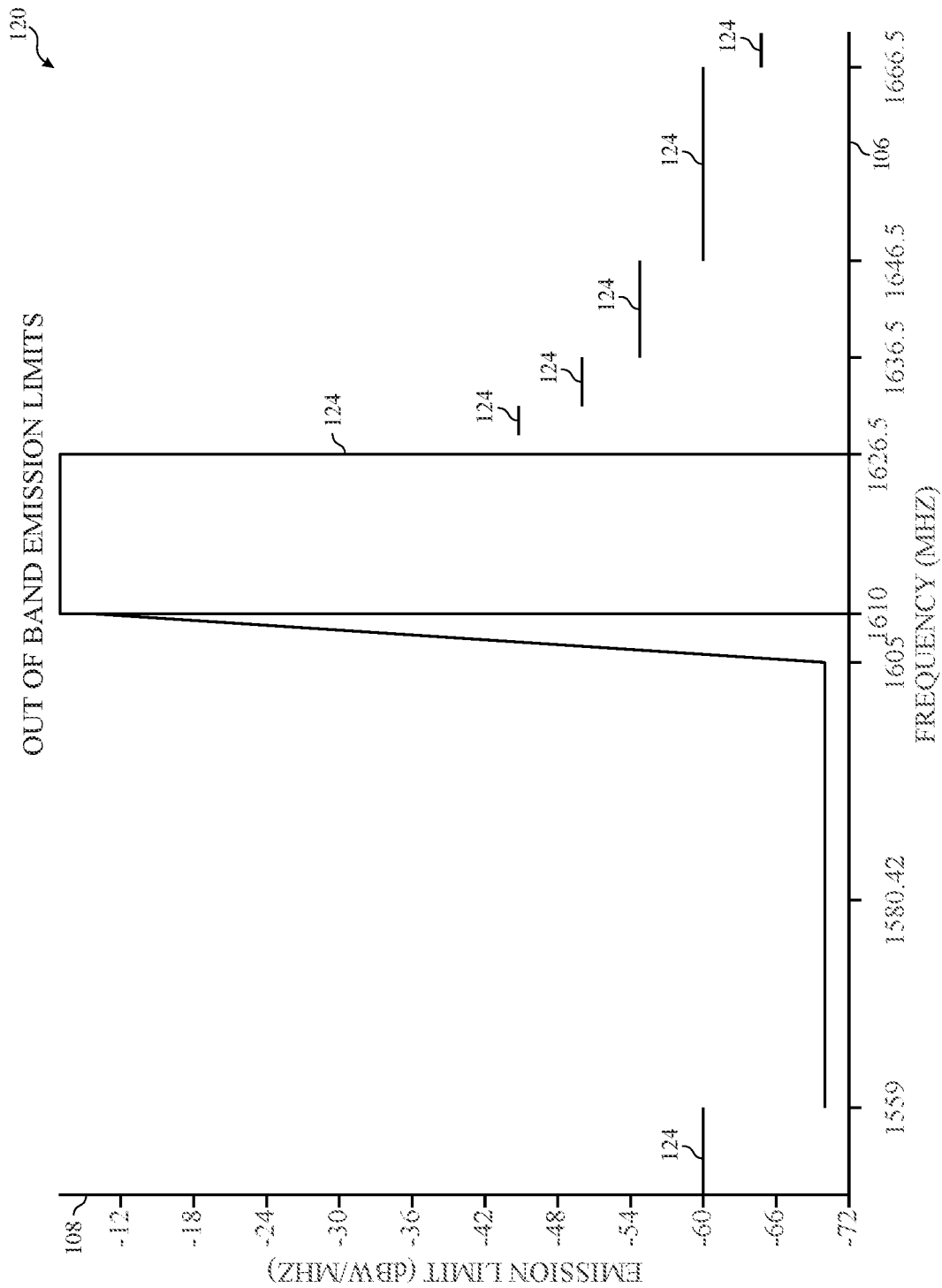
FIG. 7 is a graphical representation illustrating an out-of-band emission mask conforming to European Telecommunications Standards Institute (ETSI) standards that may be applied to or implemented on the transmitter of FIG. 3, according to an embodiment of the present disclosure.

FIG. 7 is a graphical representation of an ETSI standard 120 for an out-of-band emission mask 124 that may govern the transmitter 52, according to an embodiment of the present disclosure. The emission mask 124 may indicate one or more emission thresholds for one or more corresponding range of frequencies outside of a target frequency band 122 between 1610 MHz and 1626.5 MHz. In some embodiments, the processor 12 may receive or determine the regional standard at which the user equipment 96 is located and configure the transmitter 52 with the out-of-band emission mask 124 illustrated in FIG. 7 (e.g., using the methods 200 or 250 in FIGS. 10 and 11 discussed below) to conform to the regional standard.

Figure 8:
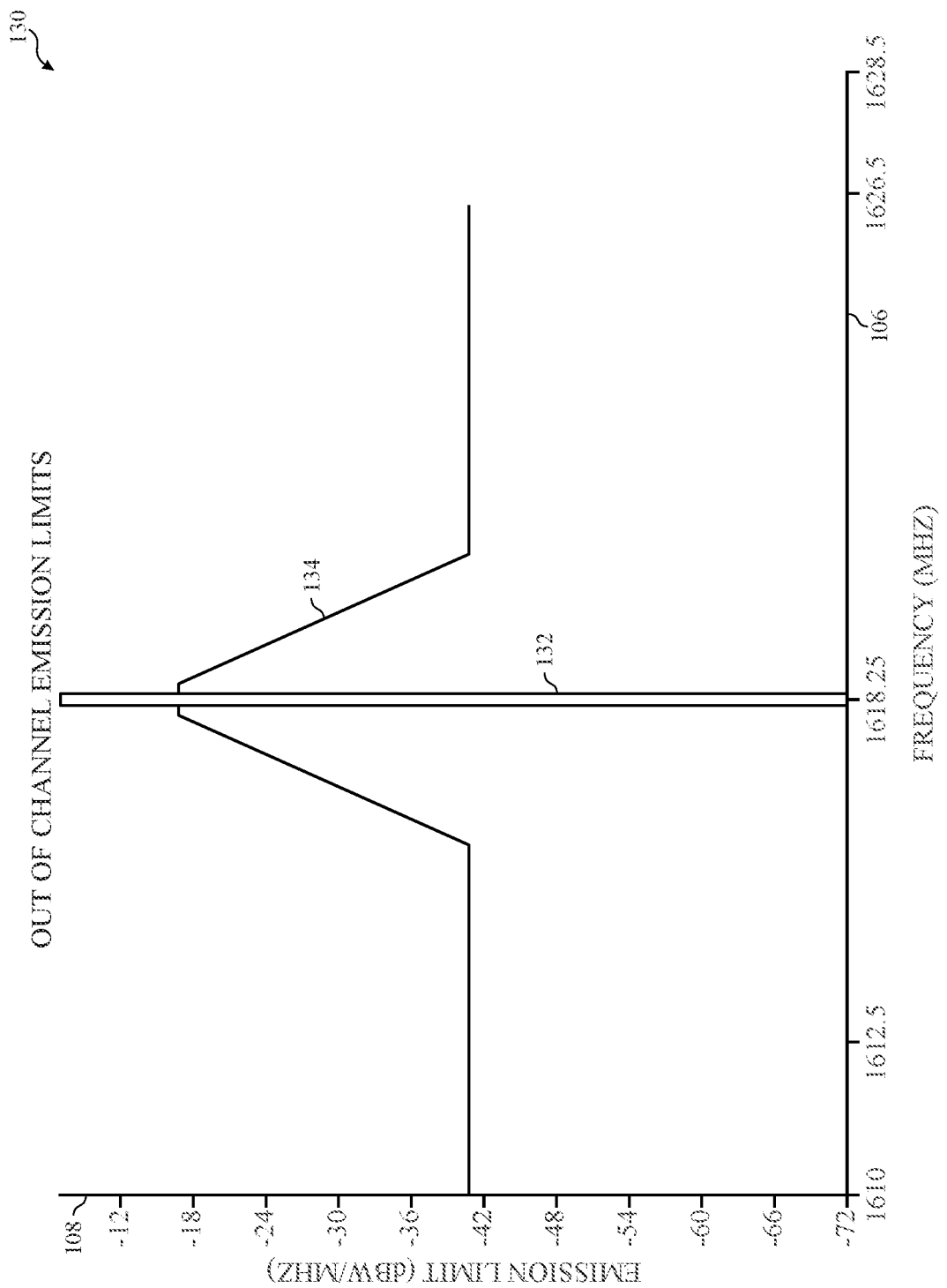
FIG. 8 is a graphical representation of an out-of-channel emission mask for a channel with an upper bound at a target frequency conforming to ETSI standards that may be applied to or implemented on the transmitter of FIG. 3, according to an embodiment of the present disclosure.

FIG. 8 is a graphical representation of an ETSI standard 130 for an out-of-channel emission mask 134 for a channel with an upper bound at a target frequency that may be applied to or implemented on the transmitter 52, according to an embodiment of the present disclosure. In particular, the emission mask 134 may indicate one or more emission thresholds for one or more corresponding range of frequencies outside of a target frequency channel 132 with an upper bound at 1618.25 MHz. In some embodiments, the processor 12 may receive or determine the regional standard at which the user equipment 96 is located and configure the transmitter 52 with the out-of-channel emission mask 134 (e.g., using the methods 200 or 250 in FIGS. 10 and 11 discussed below) to conform to the regional standard.

Figure 9:
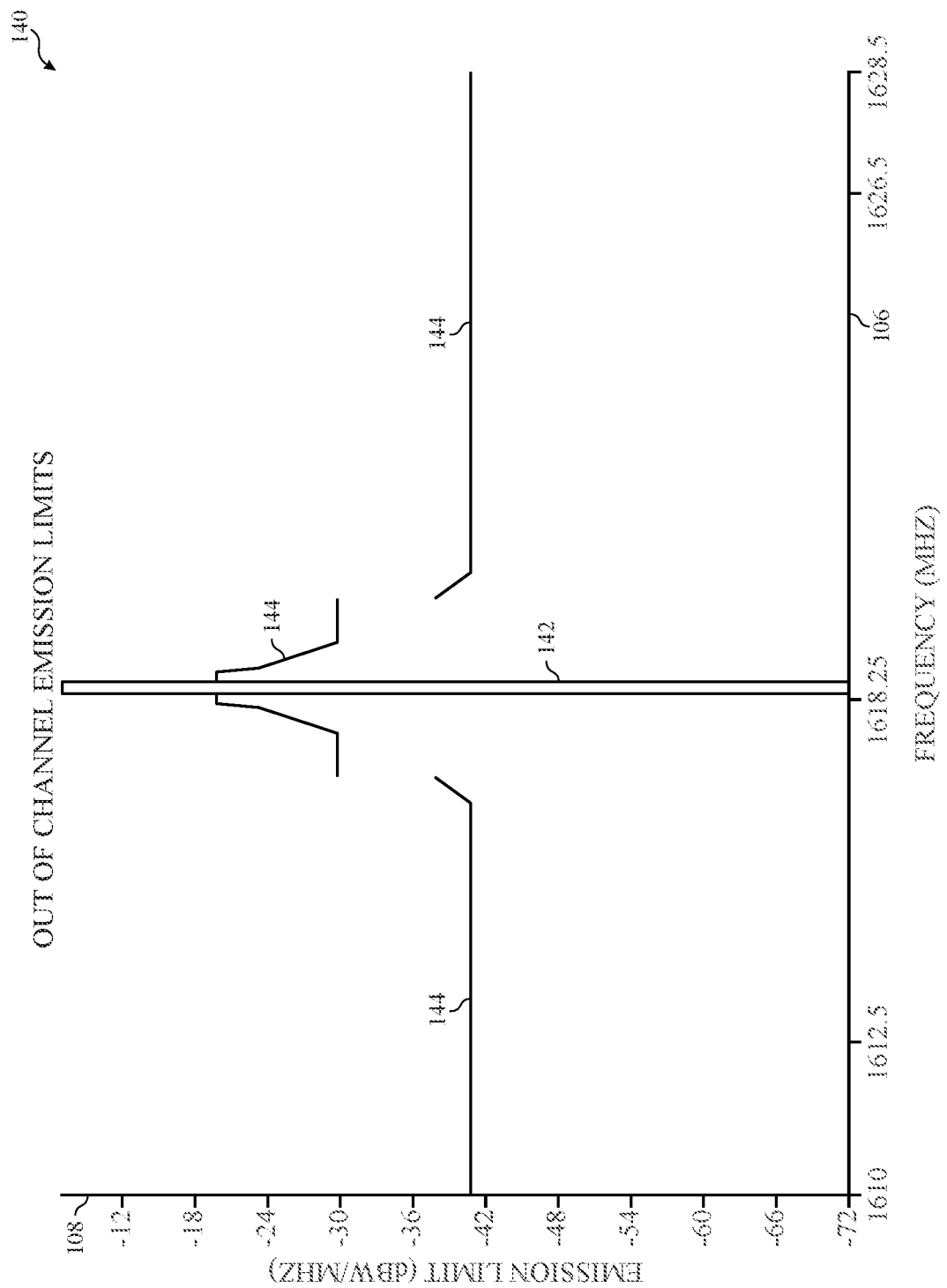
FIG. 9 is a graphical representation of an out-of-channel emission mask for a channel with a lower bound at the target frequency of FIG. 8 conforming to ETSI standards that may be applied to or implemented on the transmitter of FIG. 3, according to an embodiment of the present disclosure.

FIG. 9 is a graphical representation of an ETSI standard 140 for an out-of-channel emission mask 144 for a channel with a lower bound at the target frequency that may be applied to or implemented on the transmitter 52, according to an embodiment of the present disclosure. In particular, the emission mask 144 may indicate one or more emission thresholds for one or more corresponding range of frequencies outside of a target frequency channel 142 with a lower bound at 1618.25 MHz. In some embodiments, the processor 12 may receive or determine the regional standard at which the user equipment 96 is located and configure the transmitter 52 with the out-of-channel emission mask 144 to conform to the regional standard. As illustrated, the emission masks 134 and 144 of FIGS. 8 and 9 are channel-specific. Moreover, the ETSI-conforming emission masks 124, 134, and 144 may be applied to channels in the same frequency band, while the user equipment 96 is in the same geographical region (e.g., a region in Europe governed by ETSI). Accordingly, the disclosed embodiments may provide techniques to enable the user equipment 96 to select between different emission masks, even in the same geographical region governed by the same regulatory entity/standard body.

Conforming to the standards of the geographical region in which the user equipment 96 is located may increase the efficiency of, or even prevent deactivation of, the user equipment 96 in the different geographical regions, as the user equipment may be dynamically set to a more efficient or permissible configuration with respect to non-terrestrial transmission and reception (e.g., when it is determined under which standards the user equipment is to operate).

The user equipment 96 may determine its location using information received from the terrestrial communication node 97. The terrestrial communication node 97 may broadcast system information, via a system information block (SIB), to multiple devices (e.g., the user equipment 96) within range of (e.g., in a cell supported by) the terrestrial communication node 97). The SIB may include information that enables the user equipment 96 to establish communication with the terrestrial communication node 97, such as one or more network signaling (NS) values that indicate, to the user equipment receiving the SIB, the regulation/standard (e.g., of the FCC, ETSI, MIIT) for which to conform. Using the NS values, the processor 12 of the user equipment 96 may configure the transceiver 30 to conform to the regulation/standard of the region at which the user equipment 96 is located.

Figure 10:
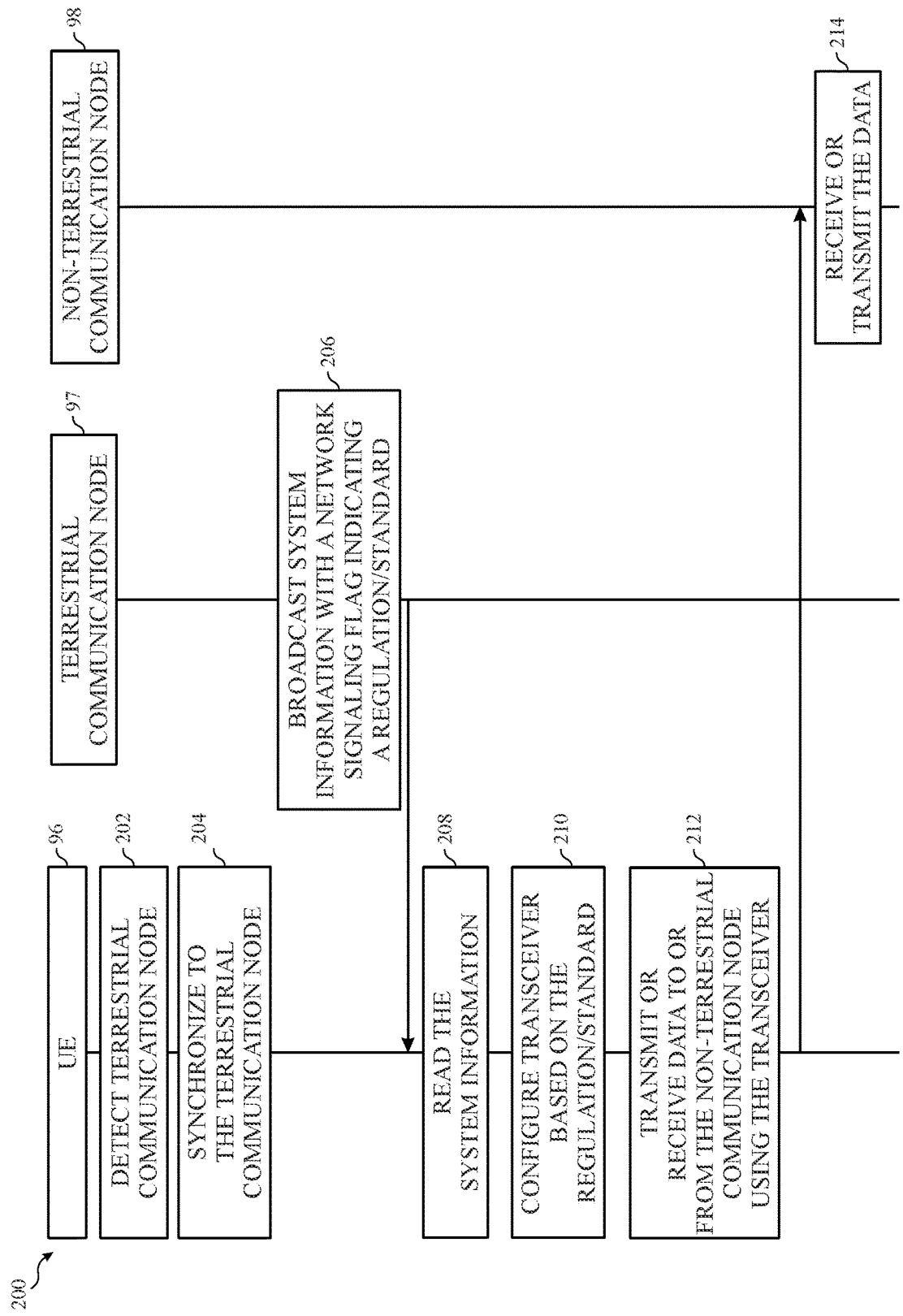
FIG. 10 is a flowchart of a method for configuring a transceiver of the electronic device of FIG. 1 (e.g., user equipment) to conform to regional regulations or standards and communicate with a non-terrestrial network (e.g., including a satellite), according to embodiment of the present disclosure.

FIG. 10 is a flowchart of a method 200 for configuring the transceiver 30 of the user equipment 96 to conform to regional regulations/standards and communicate with a non-terrestrial network (e.g., including the non-terrestrial communication node 98), according to embodiment of the present disclosure. Any suitable device (e.g., a controller) that may control components of the user equipment 96, the terrestrial communication node 97, the non-terrestrial network, and the non-terrestrial communication node 98, such as the processor 12 of each of these devices or systems, may perform the method 200. In some embodiments, the method 200 may be implemented by executing instructions stored in a tangible, non-transitory, computer-readable medium, such as the memory 14 or storage 16, using the processor 12. For example, the method 200 may be performed at least in part by one or more software components, such as an operating systems, one or more software applications, and the like, of the user equipment 96, the terrestrial communication node 97, the non-terrestrial network, and the non-terrestrial communication node 98. While the method 200 is described using steps in a specific sequence, it should be understood that the present disclosure contemplates that the described steps may be performed in different sequences than the sequence illustrated, and certain described steps may be skipped or not performed altogether.

In process block 202, the user equipment 96 detects the terrestrial communication node 97. In particular, the user equipment 96 may detect the terrestrial communication node 97 by broadcasting a radio frequency (RF) signal. Upon receiving the signal, the terrestrial communication node 97 may respond with timing alignment information, among other information. In process block 204 the user equipment 96 synchronizes to the terrestrial communication node 97 by aligning its timing with the timing alignment information of the terrestrial communication node 97.

In process block 206, the terrestrial communication node 97 broadcasts system information with an NS flag or NS value indicating a regional regulation or standard (e.g., an FCC regulation, an ETSI standard, and so on). In process block 208, the user equipment 96 reads the system information, including the NS value, and thereby determine the regional regulation/standard under which to operate. In process block 210, the user equipment 96 configures the transceiver 30 (e.g., the transmitter 52, the receiver 54, or both) based on the regulation/standard indicated by the NS value. The user equipment 96 (e.g., via the processor 12) may configure the transceiver 30 by adjusting power of the transmitter 52, adjusting the power of the receiver 54, removing one or more filters from a circuit path of the transceiver 30, adding or removing one or more low noise amplifiers from a circuit path of the transceiver, and so on. In process block 212, the user equipment 96 transmits data to or receives data from the non-terrestrial communication node 98 using the configured transceiver 30. In process block 214, the non-terrestrial communication node 98 receives data from or transmits data to the user equipment 96. In this manner, the method 200 may enable the user equipment 96 to configure the transceiver 30 to conform to regional regulations/standards and communicate with the non-terrestrial network (e.g., including the non-terrestrial communication node 98).

Figure 11:
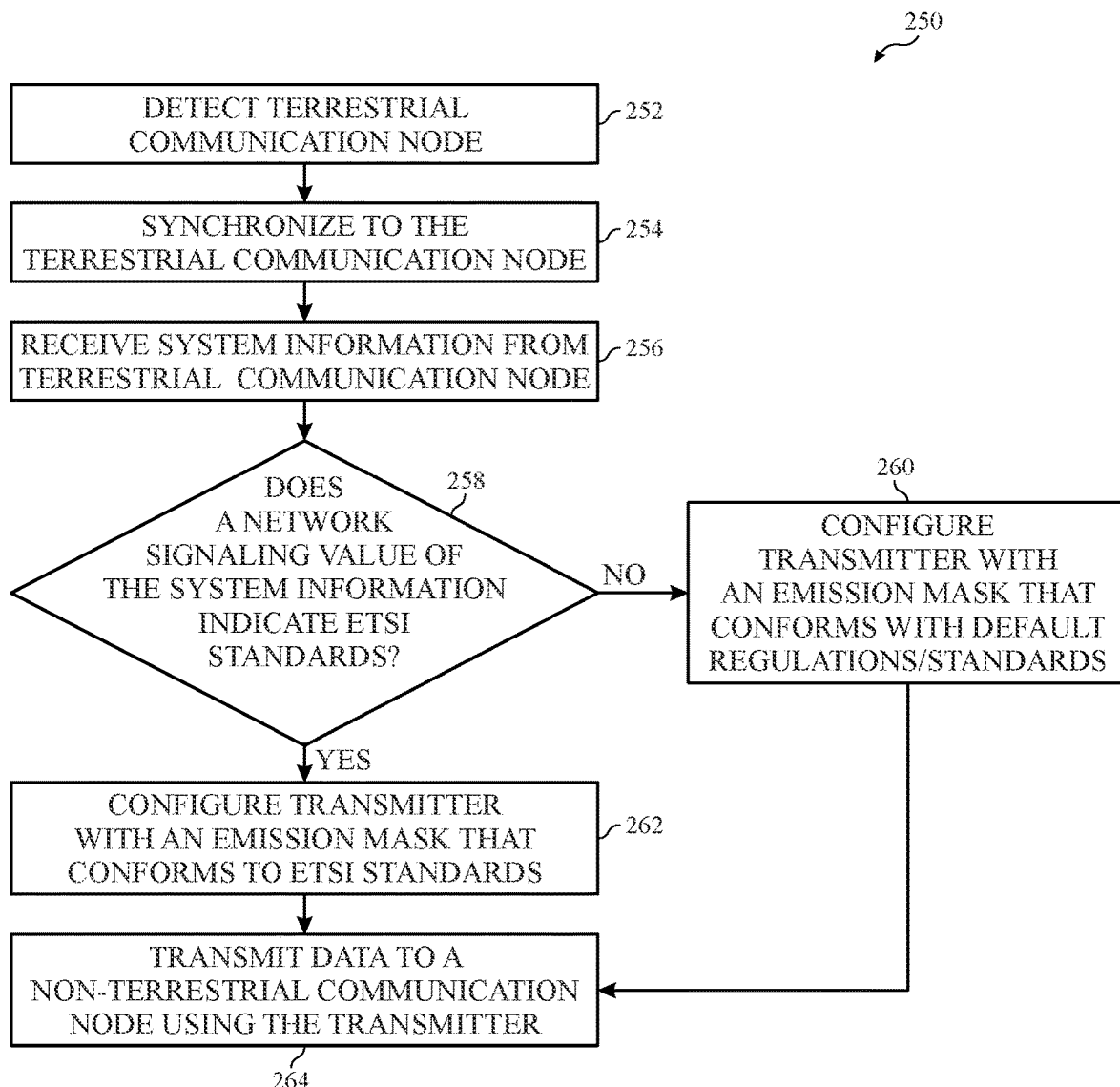
FIG. 11 is a flowchart of a method for configuring the transmitter of FIG. 3 (e.g., of user equipment) with an emission mask to conform to regional regulations or standards and communicate with a non-terrestrial network (e.g., including a satellite), according to embodiment of the present disclosure.

FIG. 11 is a flowchart of a method 250 for configuring the transmitter 52 of FIG. 3 (e.g., of the user equipment 96) with an emission mask to conform to regional regulations or standards and communicate with a non-terrestrial network (e.g., including the non-terrestrial communication node 98), according to embodiment of the present disclosure. Any suitable device (e.g., a controller) that may control components of the user equipment 96, such as the processor 12, may perform the method 250. In some embodiments, the method 250 may be implemented by executing instructions stored in a tangible, non-transitory, computer-readable medium, such as the memory 14 or storage 16, using the processor 12. For example, the method 250 may be performed at least in part by one or more software components, such as an operating systems, one or more software applications, and the like, of the user equipment 96. While the method 250 is described using steps in a specific sequence, it should be understood that the present disclosure contemplates that the described steps may be performed in different sequences than the sequence illustrated, and certain described steps may be skipped or not performed altogether.

In process block 252, the processor 12 detects the terrestrial communication node 97. In particular, the processor 12 detects the terrestrial communication node 97 by broadcasting a radio frequency (RF) signal. Upon receiving the signal, the terrestrial communication node 97 may respond with timing alignment information, among other information. In process block 204, the processor 12 synchronizes to the terrestrial communication node 97 by aligning its timing with the timing alignment information of the terrestrial communication node 97.

In process block 256, the processor 12 receives system information from the terrestrial communication node 97. That is, the terrestrial communication node 97 may broadcast system information to the user equipment 96 with an NS flag or NS value indicating a regional regulation/standard. In query block 258, the processor 12 determines whether the NS value indicates ETSI standards. That is, the terrestrial communication node 97 may indicate the regulation/standard that governs the region in which it is located in the NS value.

If the NS value indicates that ETSI standards do not govern, then in process block 260, the processor 12 configures the transmitter 52 with an emission mask that conforms to default regulations or standards. The default regulations/standards may be any set of emission regulations or standards (e.g., defined by ETSI, the FCC, etc.). However, it may be beneficial to set default configuration to a less stringent set of regulations or standards, such as the FCC regulations (as the FCC regulations may be less stringent than the ETSI standards). Therefore, the default configuration may include the emission mask 104 in FIG. 6.

If the NS value indicates that ETSI standards govern the region at that the user equipment 96 is located, then in process block 262, the processor 12 configures the transmitter 52 with an emission mask that conforms to ETSI standards (e.g., the emission masks 124, 134, and 134 of FIGS. 7, 8, and 9 respectively). Once the processor 12 has configured the transmitter 52 so as to conform to the governing regulations or standards of the region, the processor 12 transmits data to the non-terrestrial communication node 98 using the transmitter 52, as is seen in process block 264. In this manner, the method 250 may enable the processor 12 to configure the transmitter 52 of FIG. 3 (e.g., of the user equipment 96) with an emission mask to conform to regional regulations or standards and communicate with a non-terrestrial network (e.g., including the non-terrestrial communication node 98). The user equipment 96 may configure (e.g., via the processor 12) the transmitter 52, as described in the process blocks 260 and 262, by adjusting power of the transmitter 52, removing one or more filters from a circuit path of the transmitter 52, adding or removing one or more low noise amplifiers from a circuit path of the transmitter 52, and so on.

As previously stated, the emission masks may be band-specific and/or channel-specific. Thus, even if the user equipment 96 remains in the same region (e.g., a region in Europe governed by ETSI), there may be several different regulations or standards schemes (e.g., the emission masks 124, 134, and 144 in FIGS. 7, 8, and 9 respectively) to conform to depending on the frequency band and/or frequency channel allocated to the emission channel 102. Accordingly, the disclosed embodiments may provide techniques to enable the user equipment 96 to select between different emission masks, even in the same geographical region governed by the same regulatory entity/standard body.

Similarly to the regulations/standards for transmitters 52, regulations/standards for receivers 54 (e.g., receiving signals in the S band) may vary from region to region. For example, ETSI has defined out-of-band and out-of-channel standards for signal reception in the S-band for user equipment (e.g., the user equipment 96). These standards may relate to adjacent channel selectivity (ACS), in-band blocking, and/or other performance or noise characteristics. In contrast, other regulatory or standards entities, such as the FCC, may have no such regulations or standards defined for signal reception for the user equipment 96. Because of this regulatory variance, it may be beneficial to enable receiver configuration based on applicable regulation or standard for signal reception (e.g., as related to the receiver 54) as well as signal emission (e.g., as related to the transmitter 52).

Figure 12:
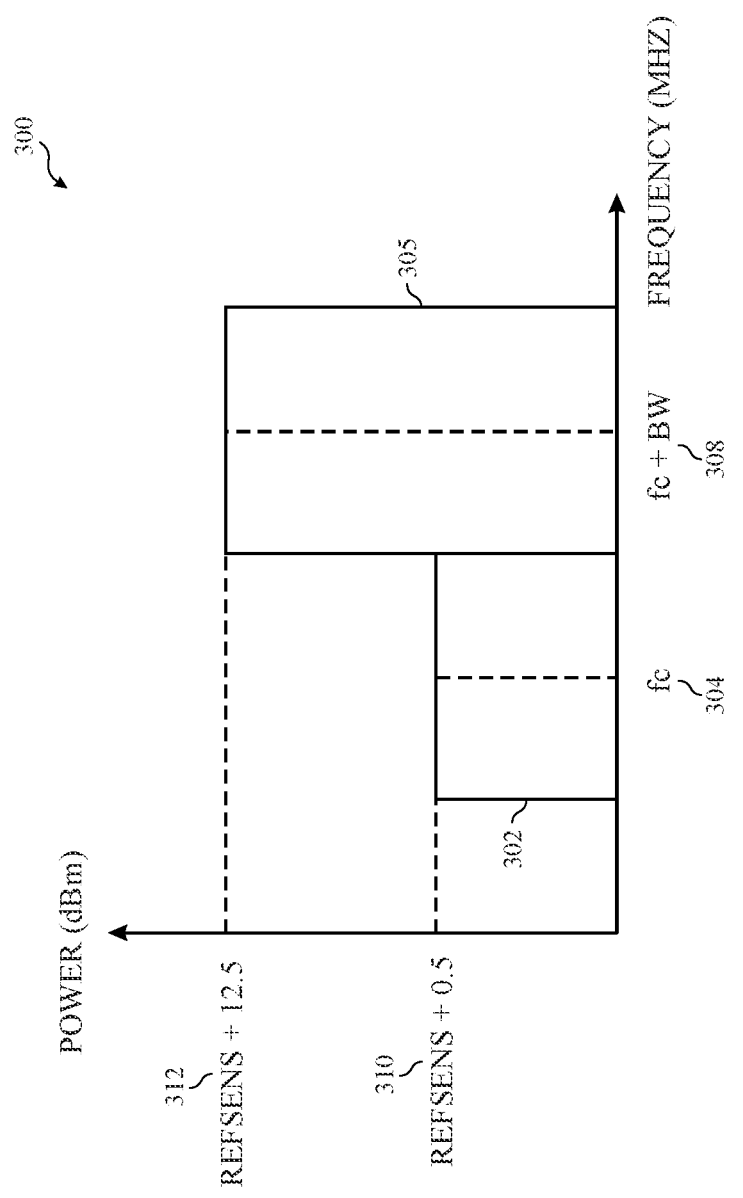
FIG. 12 is a graphical representation of an ETSI standard for adjacent channel selectivity (ACS) that may be implemented by the receiver of FIG. 4, according to an embodiment of the present disclosure.

FIG. 12 is a graphical representation of an ETSI standard 300 for adjacent channel selectivity (ACS) that may be implemented by the receiver 54, according to an embodiment of the present disclosure. ACS may include an ability of the receiver 54 to receive a desired reception signal on its assigned channel (e.g., the channel 302 having a center frequency ($f_c$) 304) in the presence of an interfering or blocking signal in an adjacent channel 305 having a center frequency 308 at a given frequency offset from the center frequency desired reception signal. The center frequency 308 of the adjacent channel 305 may be defined as the sum of the center frequency 304 of channel 302 and the bandwidth (BW) 314 of the channel 302 (or $f_c$+BW).

ETSI standards pertaining to the ACS may define a threshold power of performance degradation or a noise tolerance level (e.g., noise tolerance 310) that may not be exceeded when the interfering signal is at a specified power level (e.g., power level 312). For example, ACS-related ETSI standards may provide that desired reception signal on the channel 302 may be degraded no more than 0.5 dB (e.g., may tolerate no more than 0.5 dB of noise) when the interfering signal is present in an adjacent channel 305 (e.g., having the center frequency 308 that is the sum of the center frequency 304 of channel 302 and the bandwidth 314 of the channel 302) and has a power level 312 that is 12 dB greater than the threshold power of performance degradation/noise tolerance level 310. Therefore, if the threshold power of performance degradation is a reference sensitivity power level ("REFSENS")+0.5 dB, then the power level 312 of the interfering signal 306 is REFSENS+12.5 dB. However, it should be understood that any suitable threshold power of performance degradation 310 and/or power level of the interfering signal 306 may be used.

REFSENS may include a minimum receiver input power measured at an antenna (e.g., the antennas 55) of a receiver (e.g., the receiver 54), or a noise level at the receiver when there is no interfering signal (e.g., 306) present. It should be noted that REFSENS is not a requirement defined by ETSI, and the REFSENS value referred to in the disclosure refers to the reference sensitivity the receiver 54 exhibits without an interfering signal 306 present. However, in some embodiments, REFSENS may refer to definition provided under the New Radio standard, as shown below in Equation 1:

$$\text{REFSENSE (dBm)} = -174 \text{ dBm} + NF + 10*\log(RXBW) - \text{Diversity Gain} + SNR + IM \quad \text{(Equation 1)}$$

In Equation 1, NF is noise figure, RXBW is the received bandwidth 314 of the channel 302, diversity gain, SNR is signal-to-noise ratio, and IM is impairment margin (e.g., a measure of a capability of the receiver 54 to receive a wanted signal on its assigned channel 302 in the presence of two or more interfering signals which have a specific frequency relationship to the wanted signal). For example, REFSENS at a channel bandwidth of 20 MHz for an IM of 2.5 dB is −96.7 dBm, for an IM of 2.0 dB is −97.2 dBm, for an IM of 1.5 dB is −97.7 dBm, and for an IM of 1.0 dB is −98.2 dBm.

The primary purpose of REFSENS is to facilitate determining the degradation a desired reception signal (e.g., the channel 302) when noise is introduced (e.g., when the interfering signal 306 is present). Accordingly, the ETSI standard 300 for ACS may ensure that a sufficient quality signal is received by the receiver 54, even in the presence of noise in an adjacent channel 305.

Figure 13:
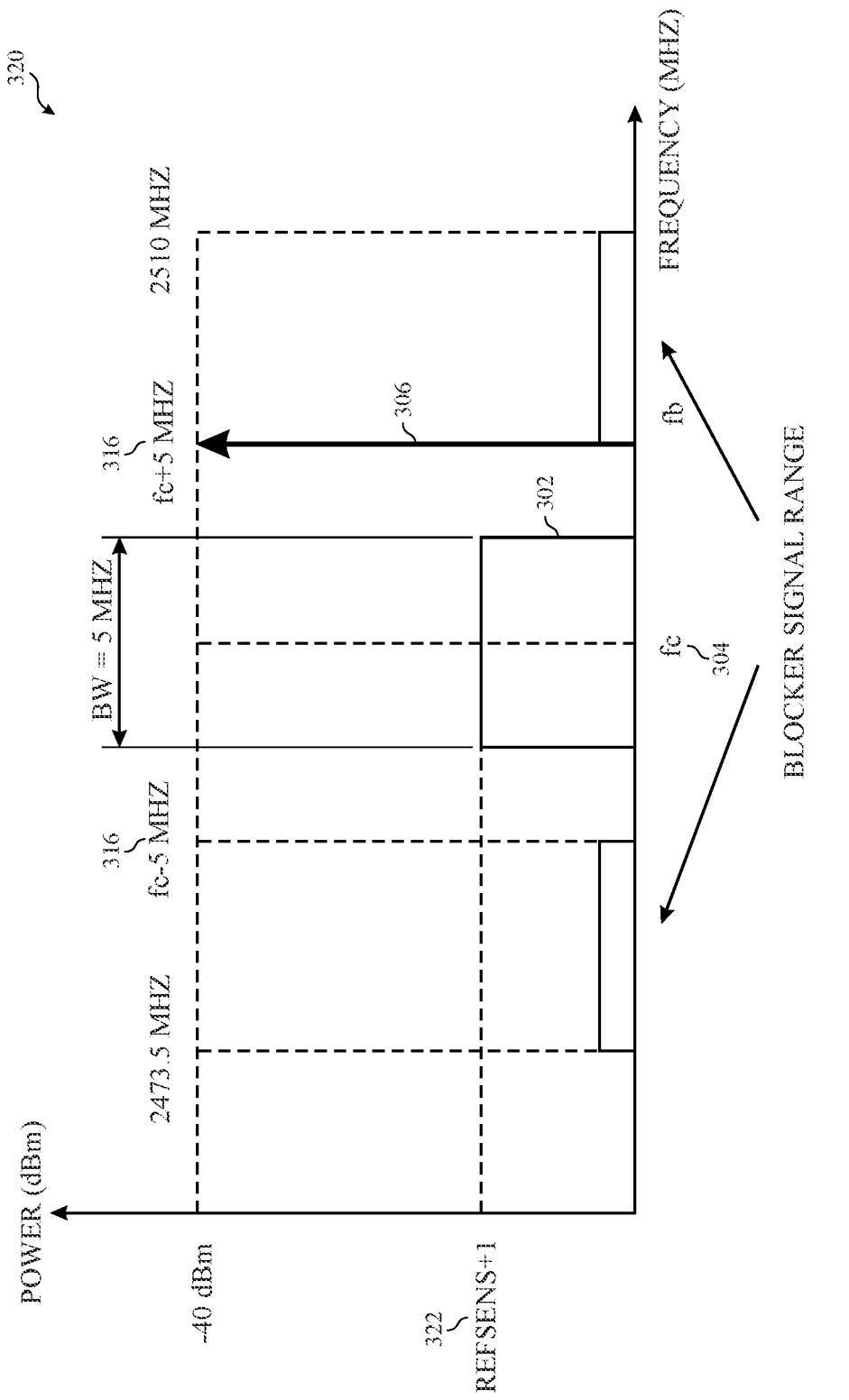
FIG. 13 is a graphical representation of an ETSI standard for in-band blocking that may be implemented by the receiver of FIG. 4, according to an embodiment of the present disclosure.

FIG. 13 is a graphical representation of an ETSI standard 320 for in-band blocking that may be implemented by the receiver 54, according to an embodiment of the present disclosure. In-band blocking may prevent noise (e.g., interfering signals) in the same frequency band as a desired received signal from excessively interfering with the desired received signal. ETSI standards specifies a threshold power of performance degradation or a noise tolerance level (e.g., threshold power of performance degradation 322) that may not be exceeded when the interfering signals are in the range of 10 MHz less than a lower edge of an operating band (e.g., $BE_L$−10 MHz) of the received signal and 10 MHz greater than an upper edge of the operating band (e.g., $BE_U$+10 MHz). ETSI defines the interfering signals at a fixed offset frequency 316 of 5 MHz offset (e.g., an offset frequency) from a center frequency 304 (e.g., $f_c$) of the channel 302 of the received signal (e.g., $f_c$+5 MHz, $f_c$−5 MHz). In particular, the interfering signals may have frequencies in a same frequency band as the received signal. Accordingly, the ETSI standard 320 for in-band blocking may ensure that a sufficient quality signal is received by the receiver 54, even in the presence of noise in the same frequency band (e.g., from 2473.5 MHz to 2510 MHz) as the signal. Thus, under ETSI standards, the offset frequency 316 will remain 5 MHz from the center frequency 304, regardless of the bandwidth 314 of the channel 302. As a result, this may limit the ability of the user equipment 96 to receive on channels having bandwidths greater than 5 MHz, and by extension limit the throughput of the channel 302. This will be addressed in greater depth in the discussion of narrowband blocking receiver configurations in FIGS. 15, 17, and 20.

The processor 12 may configure the receiver 54 to meet blocking regulations or standards, such as the ACS and in-band blocking regulations or standards, by performing power backoff and/or filtering techniques. However, complying with the blocking regulations or standards may result in certain performance trade-offs, such as power or insertion loss, leading to receiver performance or REFSENS degradation (e.g., caused by noise of the interfering signals). When not operating in regions with blocking regulations or standards (e.g., not operating in regions governed by ETSI), the user equipment 96 may benefit from configuring the receiver 54 to operate with less stringent blocking regulations or standards. Therefore, it may be advantageous to enable the processor 12 to apply different receiver configurations to meet different regional regulations or standards, depending on where the user equipment 96 is located. Similarly to the transmitter 52, the processor 12 may configure the receiver 54 with a default configuration adhering to regulations or standards (e.g., FCC regulations) that are less stringent than ETSI standards, and may reconfigure the receiver 54 to meet ETSI standards if the user equipment 96 is located in an area governed by ETSI.

Figure 14:
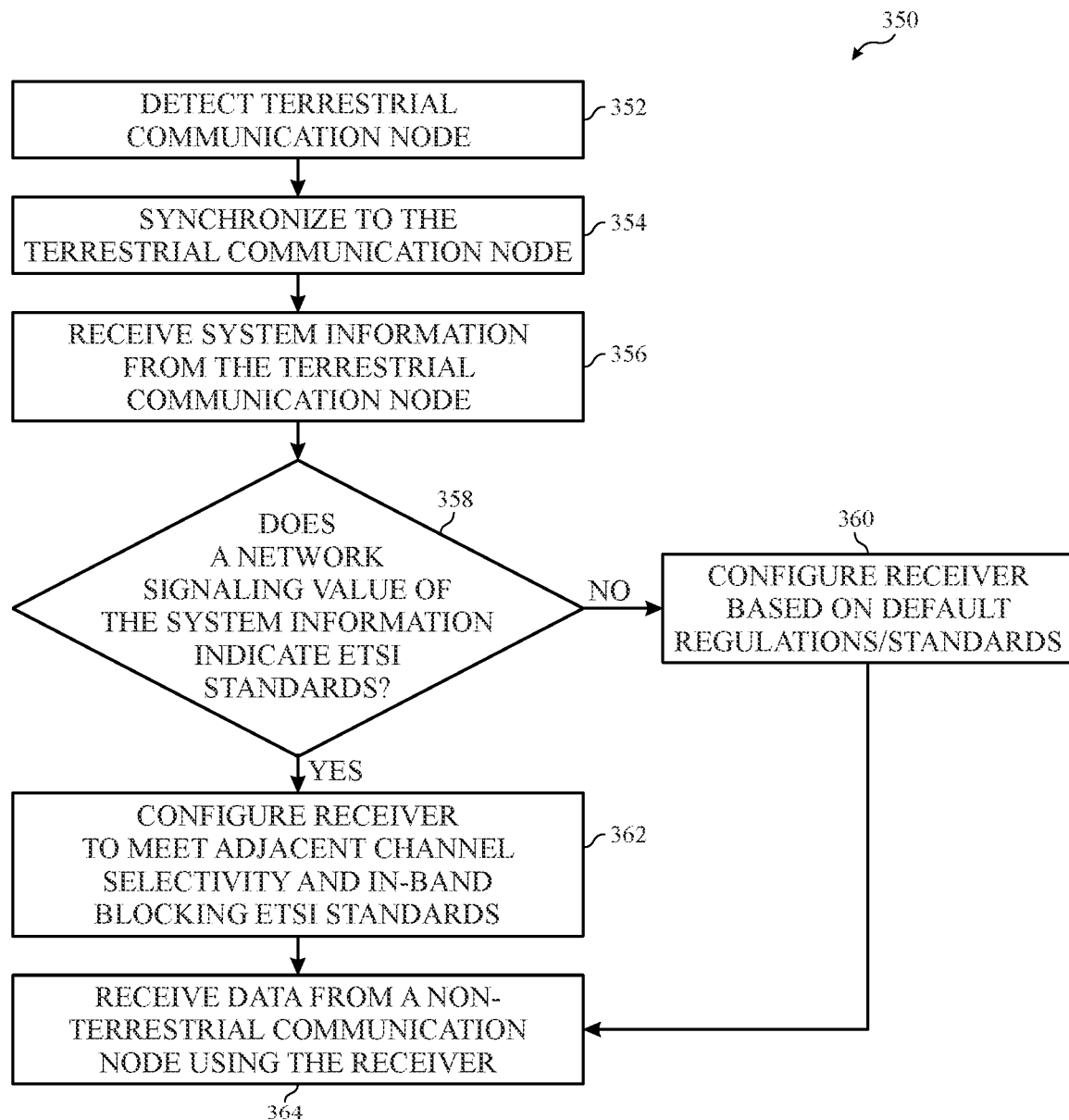
FIG. 14 is a flowchart of a method for configuring the receiver of FIG. 4 (e.g., of user equipment) to conform to regional standards governing adjacent channel selectivity and/or in-band blocking, and communicate with a non-terrestrial network (e.g., including a satellite), according to an embodiment of the present disclosure.

FIG. 14 is a flowchart of a method 350 for configuring the receiver 54 of FIG. 4 (e.g., of the user equipment 96) to conform to regional regulations/standards governing ACS and/or in-band blocking, and communicate with a non-terrestrial network (e.g., including the non-terrestrial communication node 98), according to an embodiment of the present disclosure. Any suitable device (e.g., a controller) that may control components of the user equipment 96, such as the processor 12, may perform the method 350. In some embodiments, the method 350 may be implemented by executing instructions stored in a tangible, non-transitory, computer-readable medium, such as the memory 14 or storage 16, using the processor 12. For example, the method 350 may be performed at least in part by one or more software components, such as an operating systems, one or more software applications, and the like, of the user equipment 96. While the method 350 is described using steps in a specific sequence, it should be understood that the present disclosure contemplates that the described steps may be performed in different sequences than the sequence illustrated, and certain described steps may be skipped or not performed altogether.

The processor 12 may perform process blocks 352, 354, and 356 similarly as process blocks 252, 254, and 256 of method 250 in FIG. 11. In query block 358, the processor 12 determines whether the NS value indicates ETSI standards. That is, the terrestrial communication node 97 may indicate the regulation/standard that governs the region in which it is located in the NS value. If the NS value indicates that ETSI standards do not govern, in process block 360, the processor 12 configures the receiver 54 to conform to default regulations/standards (e.g., FCC regulations). The default regulations/standards may be less stringent than other regulations/standards for which the processor 12 may conform the receiver 54 (e.g., ETSI standards). In some embodiments, the processor 12 may not configure the receiver 54 at all, as the default, less stringent regulations/standards may not apply to ACS or in-band blocking. If the NS value indicates that ETSI standards govern the region at that the user equipment 96 is located, then, in process block 362, the processor 12 configures the receiver 54 to conform to the ETSI blocking standards. That is, the processor 12 may configured the receiver 54 to conform to the ACS and in-band blocking standards discussed in FIG. 12 and FIG. 13. In process block 364, after the receiver 54 is configured to conform to the appropriate regulation/standard, the processor 12 receives data from the non-terrestrial communication node 98 using the configured receiver 54. In this manner, the method 350 may enable the processor 12 to configure the receiver 54 of FIG. 4 (e.g., of the user equipment 96) to conform to regional regulations/standards governing ACS and/or in-band blocking, and communicate with a non-terrestrial network (e.g., including the non-terrestrial communication node 98). The processor 12 may configure the receiver 54, as described in the process blocks 360 and 362, by adjusting the power of the receiver 54, removing one or more filters from a circuit path of the receiver 54, adding or removing one or more low noise amplifiers from a circuit path of the receiver 54, and so on.

Figure 15:
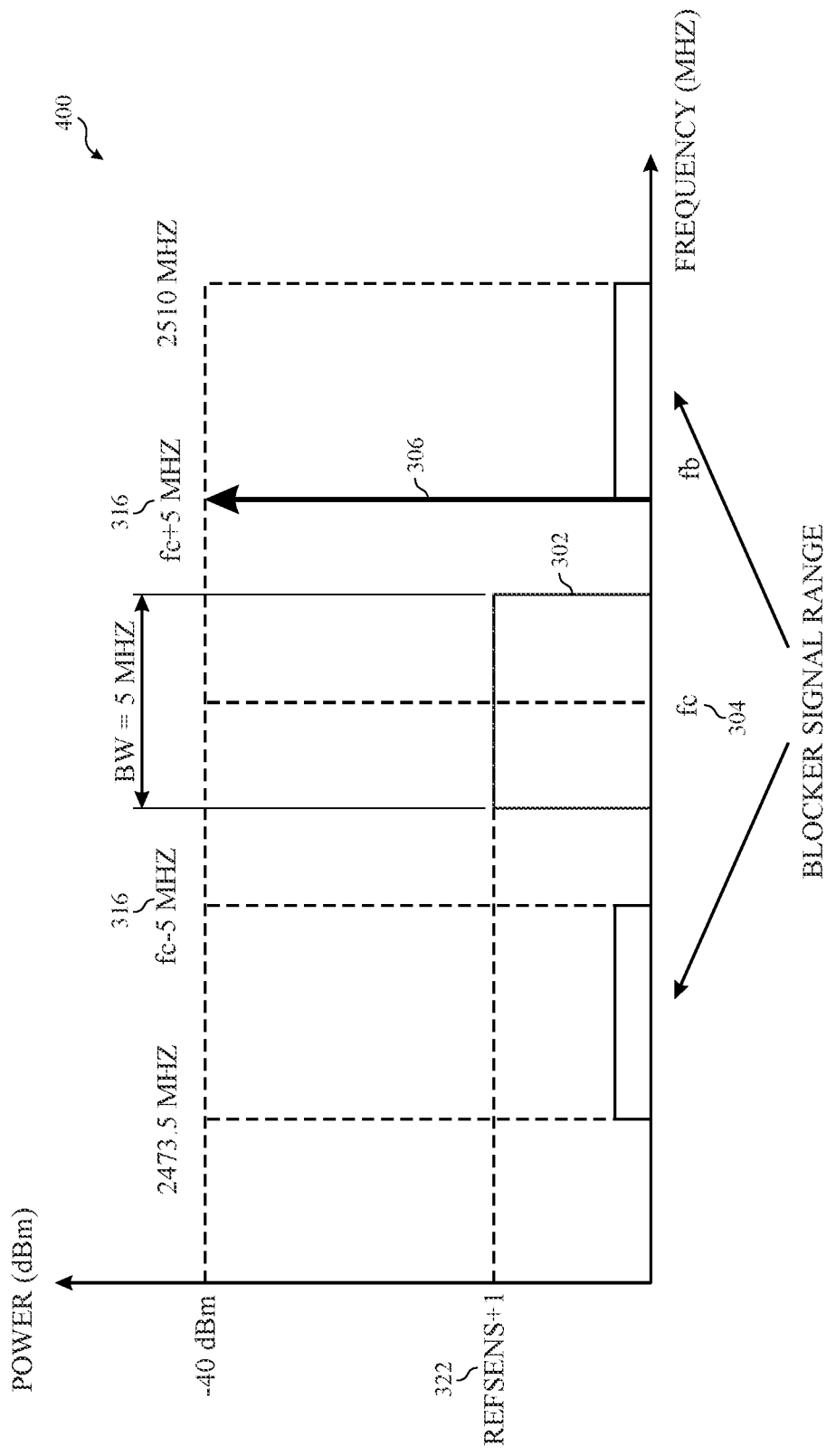
FIG. 15 is a graphical representation of a narrowband blocking scheme that may be implemented by the receiver of FIG. 4, according to an embodiment of the present disclosure.

FIG. 15 is a graphical representation of a narrowband blocking scheme 400 using channel-bandwidth-dependent scaling that may be implemented by the receiver 54, according to an embodiment of the present disclosure. Narrowband blocking may prevent noise (e.g., interfering signals) in a narrow frequency band from excessively interfering with a desired received signal. The narrowband blocking scheme 400 may be applied to reception in non-terrestrial frequency bands—particularly to signal reception in the S band, though it should be understood that the narrowband blocking scheme 400 may be applied to any suitable frequency range.

The receiver 54 of the user equipment 96 may be configured by the processor 12 to have less than or equal to a threshold power of performance degradation 322 when the receiver 54 is receiving a signal on a channel (e.g., 302) having a bandwidth (e.g., 314) and a center frequency (e.g., 304), while an interfering signal (e.g., 306) is present at a frequency (e.g., 402) equal to the bandwidth 314 offset (e.g., an offset frequency) from the center frequency 304. That is, the frequency at which the interfering signal 306 is present may scale or change in proportion with the bandwidth 314 of the channel 302. As illustrated, the threshold power of performance degradation 322 may be REFSENS+1 dB (such that a desired reception signal on the channel 302 may be degraded no more than 1 dB or may tolerate no more than 0.5 dB of noise when the interfering signal is present), while the power level for the interfering signal 306 under the narrowband blocking scheme 400 may be −40 dBm. However, it should be understood that any suitable threshold power of performance degradation 322 and/or power level of the interfering signal 306 may be used. In some embodiments, the narrowband blocking scheme 400 may include two interfering signals 306, such that the scalable offset frequency 316 (e.g., equal to the bandwidth 314) may be added to and subtracted from the center frequency 304 (e.g., resulting in two interfering signals 306 being present, one at the center frequency 304 plus the bandwidth 314, and one at the center frequency 304 minus the bandwidth 314).

If narrowband blocking scheme does not have a scalable offset frequency 316 at which the interfering signal 306 (e.g., the offset frequency is fixed, such as in the in-band blocking ETSI standard 320 of FIG. 13), the user equipment 96 may be limited in its ability to adjust the bandwidth 314 of the channel 302. For example, if a narrowband blocking scheme is implemented with a fixed offset frequency of 5 MHz, and the channel 302 has a 5 MHz bandwidth, the distance between the edges of the channel 302 and the interfering signal 306 may be 2.5 MHz. However, if it is desired to increase the bandwidth 314 of the channel 302 (e.g., to increase data throughput), the offset frequency may not increase proportionately with the increased bandwidth of the channel 302 because it is fixed at 5 MHz. As such, if the bandwidth 314 of the channel 302 were to increase from 5 MHz to 7.5 MHz, the distance between the edges of the channel 302 and the interfering signal 306 would be 1.25 MHz. The decreased distance between the channel 302 and the interfering signal 306 may result in greater interference with the channel 302 from the interfering signal 306. Moreover, this fixed offset frequency scheme may preclude the use of any channel 302 with a bandwidth 314 of 10 MHz or greater, as the channel 302 and the interfering signal 306 may be placed within the channel 302 itself.

The channel-bandwidth-dependent narrowband blocking scheme 400 may address this issue by setting the offset frequency 316 of the interfering signal 306 from the center frequency 304 equal to the channel bandwidth of the channel 302. For example, if the bandwidth 314 of the channel 302 were to increase to 7.5 MHz, then the frequency 316 that the interfering signal 306 is offset from the center frequency 304 may increase to ±7.5 MHz. As can be seen in FIG. 15, the channel 302 has a bandwidth of 10 MHz, and thus the frequency 316 that the interfering signal 306 is offset from the center frequency 304 may be ±10 MHz. Thus, the channel-bandwidth-dependent scaling scheme 400 may enable the channel 302 to have a greater bandwidth (and, as a result, throughput), while preventing interference from the interfering signal 306. Moreover, the channel-bandwidth-dependent scaling scheme 400 may be particularly useful for non-terrestrial communication networks, which may take advantage of channel bandwidths of 10 MHz or greater.

Figure 16:
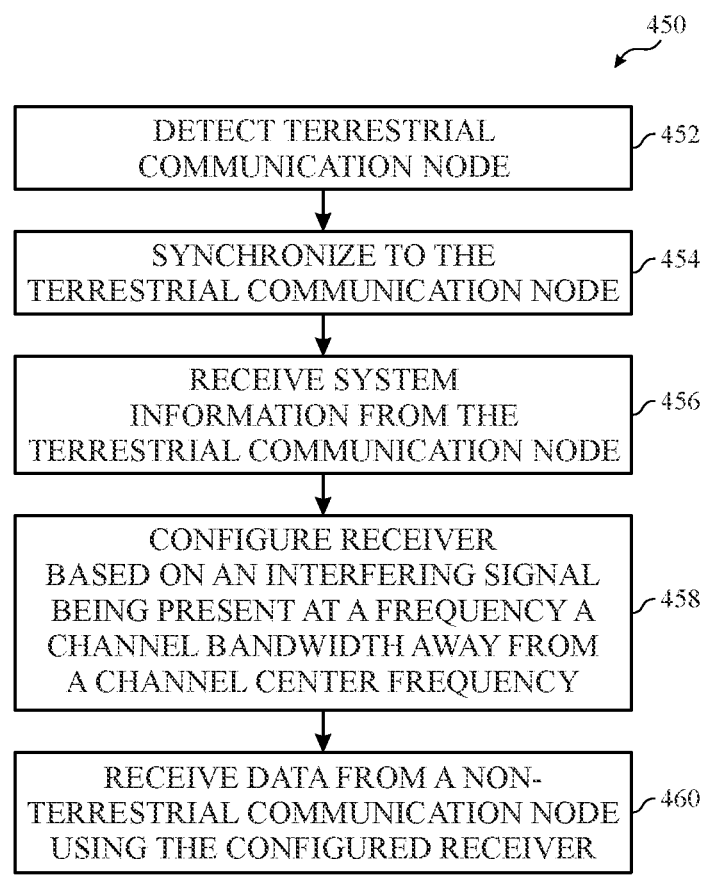
FIG. 16 is a flowchart of a method for configuring the receiver of FIG. 4 with a narrowband blocking scheme with channel-bandwidth-dependent scaling (e.g., as shown in FIG. 15), according to an embodiment of the present disclosure.

FIG. 16 is a flowchart of a method 450 for configuring the receiver 54 with a narrowband blocking scheme with channel-bandwidth-dependent scaling (e.g., the channel-bandwidth-dependent narrowband blocking scheme 400 of FIG. 15), according to an embodiment of the present disclosure. Any suitable device (e.g., a controller) that may control components of the user equipment 96, the terrestrial communication node 97, the non-terrestrial network, and the non-terrestrial communication node 98, such as the processor 12 of each of these devices or systems, may perform the method 450. In some embodiments, the method 450 may be implemented by executing instructions stored in a tangible, non-transitory, computer-readable medium, such as the memory 14 or storage 16, using the processor 12. For example, the method 450 may be performed at least in part by one or more software components, such as an operating systems, one or more software applications, and the like, of the user equipment 96, the terrestrial communication node 97, the non-terrestrial network, and the non-terrestrial communication node 98. While the method 450 is described using steps in a specific sequence, it should be understood that the present disclosure contemplates that the described steps may be performed in different sequences than the sequence illustrated, and certain described steps may be skipped or not performed altogether.

The processor 12 may perform process blocks 452, 454, and 456 similarly to process blocks 252, 254, and 256 of method 250 in FIG. 11. In process block 458, the processor 12 configures the receiver 54 based on the presence of an interfering signal (e.g., the interfering signal 306) at a frequency a channel bandwidth (e.g., the channel bandwidth 314) away from a channel center frequency (e.g., center frequency 304), as discussed in FIG. 15. In particular, the processor 12 may configure the receiver 54 to have less than or equal to a threshold power of performance degradation 322 (e.g., REFSENS+1 dB) when the receiver 54 is receiving a signal on a channel 302 having a bandwidth 314 and a center frequency 304, while an interfering signal 306 having a power level (e.g., −40 dBm) is present at a frequency 316 offset equal to the bandwidth 314 from the center frequency 304. The processor 12 may configure the receiver 54, as described in the process block 458, by adjusting the power of the receiver 54, removing one or more filters from a circuit path of the receiver 54, adding or removing one or more low noise amplifiers from a circuit path of the receiver 54, and so on.

In process block 460, the processor 12 receives data from a non-terrestrial communication node (e.g., the non-terrestrial communication node 98) using the configured receiver 54. As such, the method 450 may enable the processor 12 to configure the receiver 54 of FIG. 4 (e.g., of the user equipment 96) to implement the narrowband blocking scheme 400 with channel-bandwidth-dependent scaling, thus enabling greater channel bandwidths and/or greater throughput.

Figure 17:
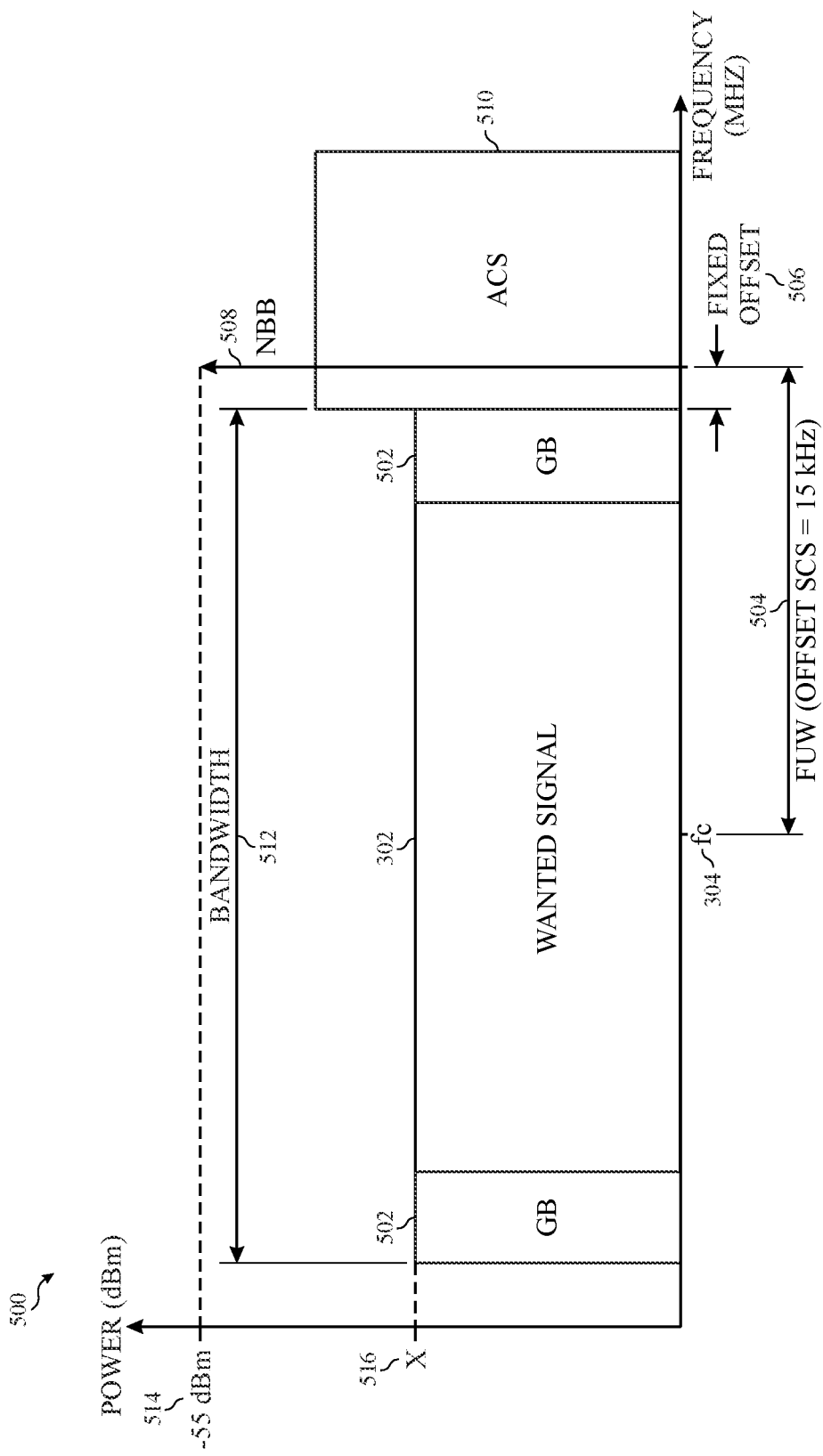
FIG. 17 is a graphical representation of a narrowband blocking scheme based on the 4th Generation (4G) or Long-Term Evolution (LTE) narrowband blocking specification that may be implemented by the receiver of FIG. 4, according to an embodiment of the present disclosure.

FIG. 17 is a graphical representation of a narrowband blocking scheme 500 based on the 4G/LTE narrowband blocking specification that may be implemented by the receiver 54, according to an embodiment of the present disclosure. Similar to narrowband blocking scheme 400 with channel-bandwidth-dependent scaling of FIG. 15, the narrowband blocking scheme 500 implements a scalable frequency 504 of an interfering signal 508 offset (e.g., an offset frequency) from a center frequency 304 of a channel 302 of a desired reception signal (e.g., a wanted signal). For a subcarrier spacing of 15 kilohertz (kHz) (as defined by 4G/LTE), the offset frequency 504 (or unwanted frequency ($f_{uw}$)) may include half the channel bandwidth 512 and a fixed offset frequency 506 (e.g., 200 kilohertz (kHz)). The subcarrier spacing may be associated with a channel 510 of the interfering signal 508, the channel 302 of the desired reception signal, and/or the 4G/LTE standard. The channel 302 may also include guard bands 502, which may serve as a buffer or "guard" the received signal and/or its channel 302 from the interfering signal 508.

In particular, the offset frequency 504 may be defined as a first sum of half the subcarrier spacing value and a product of the subcarrier spacing value and a ceiling (e.g., as provided by a ceiling function) of a quotient of a second sum of half the channel bandwidth 512 and the fixed offset frequency 506 (e.g., $f_{offset\_fix}$) divided by the subcarrier spacing value, as illustrated by Equation 2 below:

$$f_{uw} = \left\lceil \frac{\frac{BW}{2} + f_{offset\_fix}}{SCS} \right\rceil * SCS + \frac{SCS}{2} \quad \text{(Equation 2)}$$

The threshold power of performance degradation 516 may depend on the channel bandwidth 512, according to the 3GPP specification. In particular, FIG. 18 is a table 530 illustrating the threshold power of performance degradation 516 for different channel bandwidths 534. For example, the threshold power of performance degradation 516 is 16 dB for a channel bandwidth 512 of 5 MHz or 20 MHz, 13 dB for 10 MHz, 14 dB for 15 MHz, and so on. Turning back to FIG. 17, the power level 514 (e.g., $P_{uw}(CW)$) for the interfering signal 508 under the narrowband blocking scheme 500 may be −55 dBm. However, it should be understood that any suitable threshold power of performance degradation 516 and/or power level of the interfering signal 508 may be used. Additionally, as illustrated, the narrowband blocking scheme 500 may include one interfering signal 508 disposed the channel bandwidth 512 away from the center frequency 304. In additional or alternative embodiments, the narrowband blocking scheme 500 may include two interfering signals 508, such that the offset frequency 504 may be added to and subtracted from the center frequency 304 (e.g., resulting in two interfering signals 508 being present, one at the center frequency 304 plus the channel bandwidth 512, and one at the center frequency 304 minus the channel bandwidth 512). The ceiling function of Equation 2 is performed by rounding any resulting decimal inside the ceiling function up to the nearest integer.

As a particular example, for the channel bandwidth 512 of 5 MHz (which has a guard band 502 of 0.25 MHz), the subcarrier spacing of 15 kHz, and the fixed offset frequency 506 of 200 kHz, the offset frequency 504 is 2.7075 MHz. As another example, for a channel bandwidth of 10 MHz, the subcarrier spacing of 15 kHz, and the fixed offset frequency 506 of 200 kHz, the offset frequency 504 is 5.2125 MHz. As with the channel-bandwidth-dependent narrowband blocking scheme 400 of FIG. 15, the narrowband blocking scheme 500 based on the 4G/LTE narrowband blocking specification may enable the channel 302 to have a greater bandwidth (and, as a result, throughput), while preventing interference from the interfering signal 508. Moreover, narrowband blocking scheme 500 may be particularly useful for non-terrestrial communication networks, which may take advantage of channel bandwidths of 10 MHz or greater.

Figure 19:
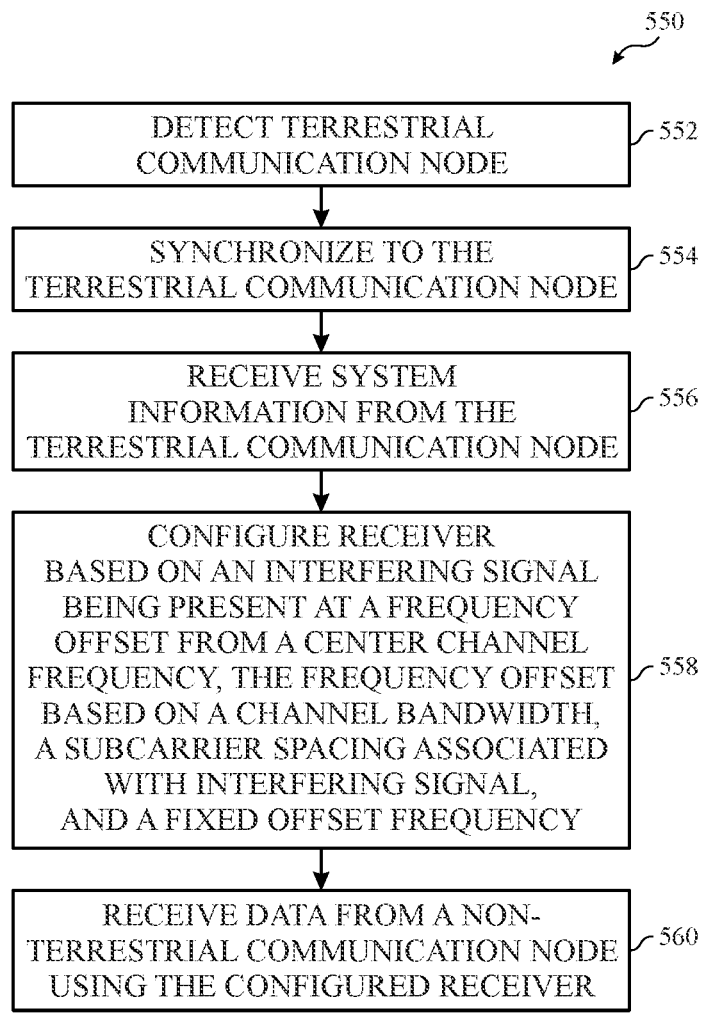
FIG. 19 is a flowchart of a method for configuring the receiver of FIG. 4 with a narrowband blocking scheme based on the 4G/LTE narrowband blocking specification (e.g., as shown in FIG. 17), according to an embodiment of the present disclosure.

FIG. 19 is a flowchart of a method 550 for configuring the receiver 54 with a narrowband blocking scheme based on the 4G/LTE narrowband blocking specification (e.g., the narrowband blocking scheme 500 of FIG. 17), according to an embodiment of the present disclosure. Any suitable device (e.g., a controller) that may control components of the user equipment 96, the terrestrial communication node 97, the non-terrestrial network, and the non-terrestrial communication node 98, such as the processor 12 of each of these devices or systems, may perform the method 550. In some embodiments, the method 550 may be implemented by executing instructions stored in a tangible, non-transitory, computer-readable medium, such as the memory 14 or storage 16, using the processor 12. For example, the method 550 may be performed at least in part by one or more software components, such as an operating systems, one or more software applications, and the like, of the user equipment 96, the terrestrial communication node 97, the non-terrestrial network, and the non-terrestrial communication node 98. While the method 550 is described using steps in a specific sequence, it should be understood that the present disclosure contemplates that the described steps may be performed in different sequences than the sequence illustrated, and certain described steps may be skipped or not performed altogether.

The processor 12 may perform process blocks 552, 554, and 556 similarly to process blocks 252, 254, and 256 of method 250 in FIG. 11. In process block 558, the user equipment 96 configures the receiver 54 based on the presence of an interfering signal (e.g., interfering signal 508) at a frequency 504 offset (e.g., the unwanted or offset frequency) from the center frequency 304. As previously discussed in FIG. 17, the offset frequency 504 may be based on a channel bandwidth (e.g., the bandwidth 512 of channel 302), a subcarrier spacing associated with the interfering signal 508, and a fixed offset frequency 506. In particular, the offset frequency 504 may be defined as a first sum of half the subcarrier spacing value and a product of the subcarrier spacing value and a ceiling (e.g., as provided by a ceiling function) of a quotient of a second sum of half the channel bandwidth 512 and the fixed offset frequency 506 (e.g., $f_{offset\_fix}$) divided by the subcarrier spacing value, as illustrated by Equation 2 above. The threshold power of performance degradation 516 may depend on the channel bandwidth 512, according to the 3GPP specification and/or as illustrated in the table 530 of FIG. 18. The power level 514 for the interfering signal 508 under the narrowband blocking scheme 500 may be −55 dBm. The processor 12 may configure the receiver 54, as described in the process block 558, by adjusting the power of the receiver 54, removing one or more filters from a circuit path of the receiver 54, adding or removing one or more low noise amplifiers from a circuit path of the receiver 54, and so on.

In process block 560, the processor 12 receives data from a non-terrestrial communication node (e.g., non-terrestrial communication node 98) using the configured receiver 54. As such, the method 550 may enable the processor 12 to configure the receiver 54 of FIG. 4 (e.g., of the user equipment 96) to implement the narrowband blocking scheme 500 based on the 4G/LTE narrowband blocking specification, thus enabling greater channel bandwidths and/or greater throughput.

Figure 20:
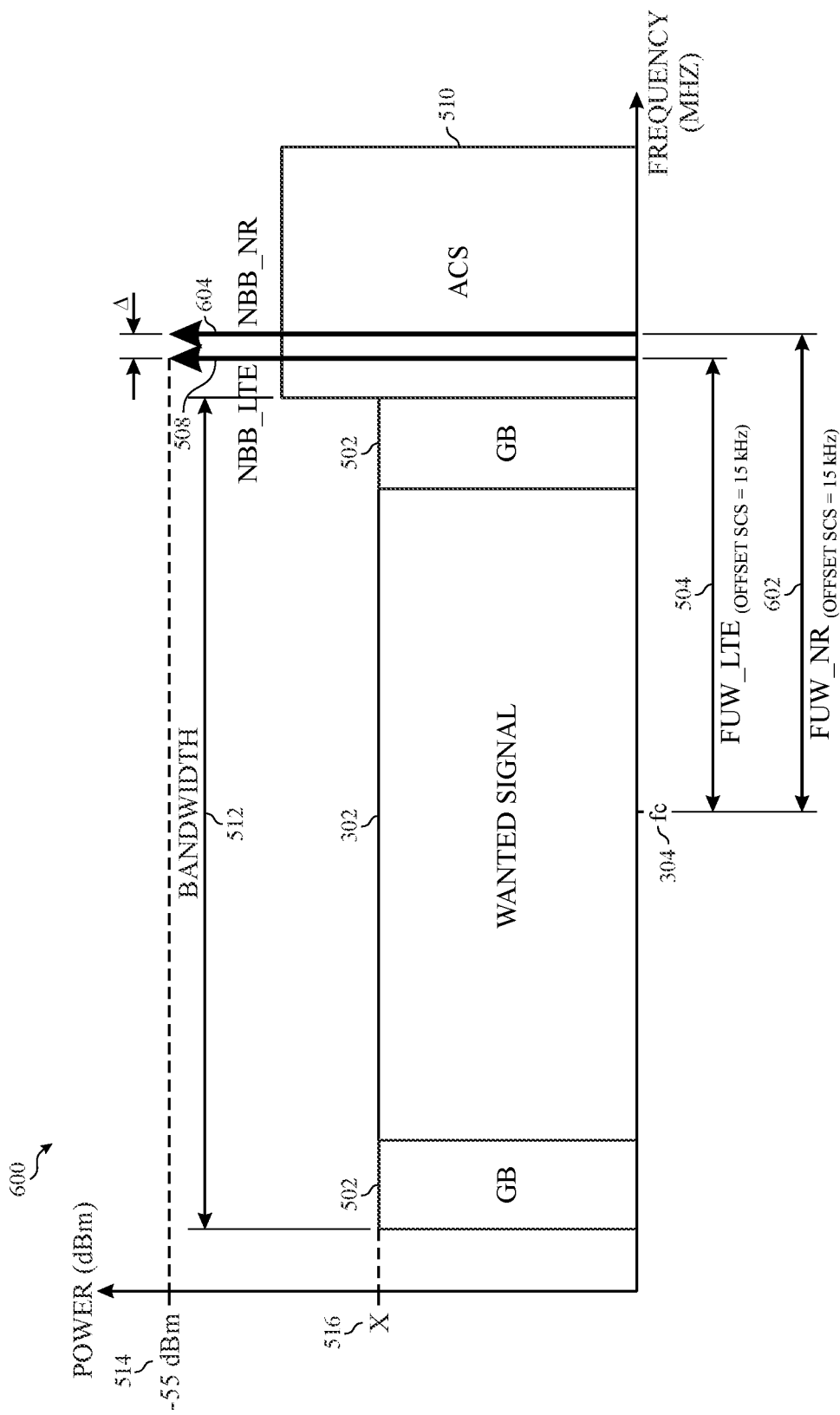
FIG. 20 is a graphical representation of a narrowband blocking scheme based on the 5th Generation (5G) or New Radio (NR) narrowband blocking specification that may be implemented by the receiver of FIG. 4, according to an embodiment of the present disclosure.

FIG. 20 is a graphical representation of a narrowband blocking scheme 600 based on the 5G/New Radio (NR) narrowband blocking specification that may be implemented by the receiver 54, according to an embodiment of the present disclosure. Similarly to FIG. 17, there may be a desired signal (e.g., a wanted signal) on a channel 302 with a center frequency 304, guard bands 502, and an interfering signal (e.g., interfering signal 604) in an adjacent or nearby channel (e.g., channel 510). Similarly to narrowband blocking scheme 500 based on the 4G/LTE narrowband blocking specification of FIG. 17, the interfering signal 604 may have a frequency 602 (e.g., an unwanted or offset frequency ($f_{uw}$)) offset from the center frequency 304 of the channel 302. For a subcarrier spacing of 15 kHz (as defined by 5G/NR, the offset frequency 602 may be based on the channel bandwidth 512 of the channel 302, a subcarrier spacing value, and a number of resource blocks (NRB). The subcarrier spacing and the number of resource blocks or subcarriers may be associated with the channel 510 of the interfering signal 604, the channel 302 of the desired reception signal, and/or the 5G/NR standard. In particular, the offset frequency 602 may be defined as a sum of half the subcarrier spacing value and a first product of the subcarrier spacing value and a floor (e.g., as provided by a floor function) of a quotient of a difference between the channel bandwidth 512 and half of a second product of the number of resource blocks, the subcarrier spacing value, and a constant value (e.g., 12), divided by the subcarrier spacing value, as illustrated by Equation 3 below:

$$\left\lfloor \frac{BW - \left(\frac{NRB*SCS*12}{2}\right)}{SCS} \right\rfloor *SCS + \frac{SCS}{2} \qquad \text{(Equation 3)}$$

As with the narrowband blocking scheme 500 based on the 4G/LTE narrowband blocking specification of FIG. 17 above, the threshold power of performance degradation 516 may depend on the channel bandwidth 512, according to the 3GPP specification and/or the table 530 of FIG. 18. Similarly, the power level 514 for the interfering signal 604 under the narrowband blocking scheme 600 may be −55 dBm. However, it should be understood that any suitable threshold power of performance degradation 516 and/or power level of the interfering signal 604 may be used. Additionally, as illustrated, the narrowband blocking scheme 600 may include one interfering signal 604 disposed the channel bandwidth 512 away from the center frequency 304. In additional or alternative embodiments, the narrowband blocking scheme 600 may include two interfering signals 604, such that the offset frequency 602 may be added to and subtracted from the center frequency 304 (e.g., resulting in two interfering signals 604 being present, one at the center frequency 304 plus the channel bandwidth 512, and one at the center frequency 304 minus the channel bandwidth 512). The floor function of Equation 3 is performed by rounding any resulting decimal inside the ceiling function down to the nearest integer.

As a particular example, for a channel bandwidth 512 of 10 MHz, the subcarrier spacing of 15 kHz, and a number of resource blocks of 52 the offset frequency 602 is 5.3175 MHz. When compared to the narrowband blocking scheme 500 based on the 4G/LTE narrowband blocking specification of FIG. 17, which yields the offset frequency 504 of 5.2125

MHz, the narrowband blocking scheme 600 based on the 5G/NR narrowband blocking specification is 105 kHz greater. As with the channel-bandwidth-dependent narrowband blocking scheme 400 of FIG. 15 and the narrowband blocking scheme 500 based on the 4G/LTE narrowband blocking specification of FIG. 17, the narrowband blocking scheme 600 based on the 5G/NR narrowband blocking specification may enable the channel 302 to have a greater bandwidth (and, as a result, throughput), while preventing interference from the interfering signal 604. Moreover, narrowband blocking scheme 600 may be particularly useful for non-terrestrial communication networks, which may take advantage of channel bandwidths of 10 MHz or greater.

Figure 21:
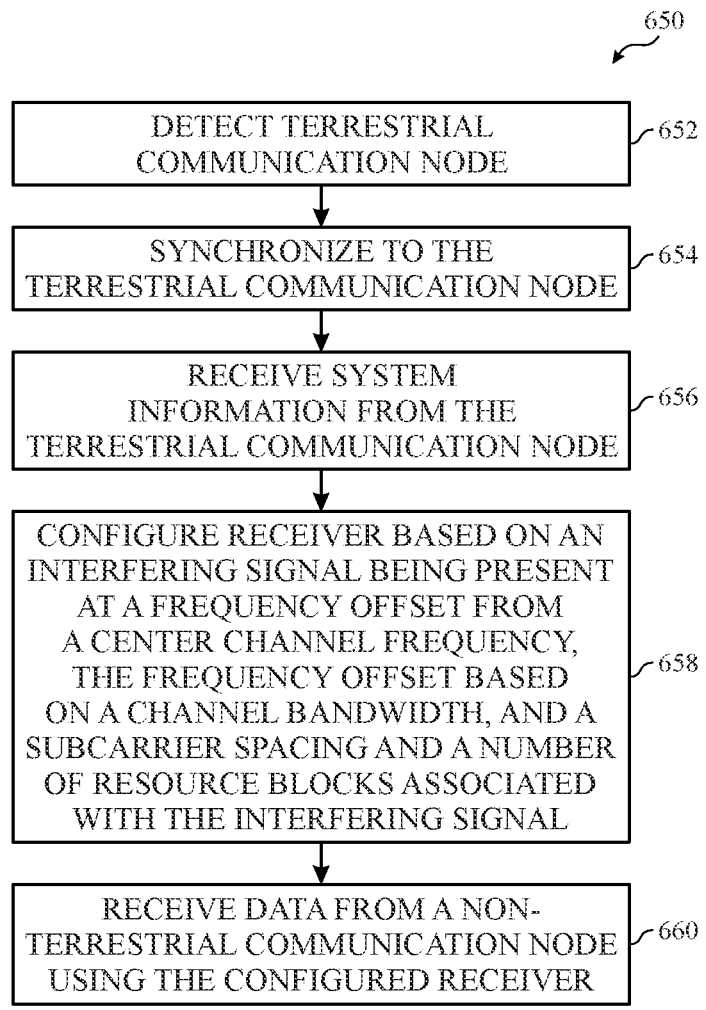
FIG. 21 is a flowchart of a method for configuring the receiver of FIG. 4 with a narrowband blocking scheme based on the 5G/NR narrowband blocking specification (e.g., as shown in FIG. 20), according to an embodiment of the present disclosure.

FIG. 21 is a flowchart of a method 650 for configuring the receiver 54 with a narrowband blocking scheme using the 5G/New Radio (NR) narrowband blocking specification (e.g., the narrowband blocking scheme 600 of FIG. 20), according to an embodiment of the present disclosure. Any suitable device (e.g., a controller) that may control components of the user equipment 96, the terrestrial communication node 97, the non-terrestrial network, and the non-terrestrial communication node 98, such as the processor 12 of each of these devices or systems, may perform the method 650. In some embodiments, the method 650 may be implemented by executing instructions stored in a tangible, non-transitory, computer-readable medium, such as the memory 14 or storage 16, using the processor 12. For example, the method 650 may be performed at least in part by one or more software components, such as an operating systems, one or more software applications, and the like, of the user equipment 96, the terrestrial communication node 97, the non-terrestrial network, and the non-terrestrial communication node 98. While the method 650 is described using steps in a specific sequence, it should be understood that the present disclosure contemplates that the described steps may be performed in different sequences than the sequence illustrated, and certain described steps may be skipped or not performed altogether.

The processor 12 may perform process blocks 652, 654, and 656 similarly to process blocks 252, 254, and 256 of method 250 in FIG. 11. In process block 658, the processor 12 may configure the receiver 54 based on the presence of an interfering signal (e.g., the interfering signal 604) at a frequency 602 (e.g., the unwanted frequency) from a center channel frequency (e.g., center frequency 304 of channel 302). As previously discussed in FIG. 17, the offset frequency 602 may be based on a channel bandwidth (e.g., the bandwidth 512 of channel 302), a subcarrier spacing and a number of resource blocks associated with the interfering signal 604. In particular, the offset frequency 602 may be defined as a sum of half the subcarrier spacing value and a first product of the subcarrier spacing value and a floor (e.g., as provided by a floor function) of a quotient of a difference between the channel bandwidth 512 and half of a second product of the number of resource blocks, the subcarrier spacing value, and a constant value (e.g., 12), divided by the subcarrier spacing value, as illustrated by Equation 3 above. The threshold power of performance degradation 516 may depend on the channel bandwidth 512, according to the 3GPP specification and/or as illustrated in the table 530 of FIG. 18. The power level 514 for the interfering signal 604 under the narrowband blocking scheme 500 may be −55 dBm. The processor 12 may configure the receiver 54, as described in the process block 658, by adjusting the power of the receiver 54, removing one or more filters from a circuit path of the receiver 54, adding or removing one or more low noise amplifiers from a circuit path of the receiver 54, and so on.

In process block 660, the processor 12 receives data from a non-terrestrial communication node (e.g., non-terrestrial communication node 98) using the configured receiver 54. As such, the method 650 may enable the processor 12 to configure the receiver 54 of FIG. 4 (e.g., of the user equipment 96) to implement the narrowband blocking scheme 600 based on the 5G/NR narrowband blocking specification, thus enabling greater channel bandwidths and/or greater throughput.

As described above, the various standards (e.g., 300, 320, 400) or schemes (e.g., 500, 600) may define a threshold for which noise level of a received signal is not to exceed in the presence of an interfering signal. For example, as mentioned in FIG. 13 above, the ETSI standard 320 ensures that a noise level of a received signal on the channel 302 (e.g., having a bandwidth 314 of 5 MHz) does not exceed a threshold 322 (e.g., of 1 decibel (dB)) when there are interfering signals present at 5 MHz less than the center frequency 304 and at 5 MHz greater than the center frequency 304. The threshold 322 may be determined based on how far (e.g., in frequency) the interfering signal is offset (e.g., an offset frequency) from the channel 302, as the closer the interfering signal is to the channel 302 (e.g., the smaller the offset frequency 316), the greater the effect of interference from the interfering signal on the channel 302. That is, the threshold 322 varies inversely with the frequency 316 that the interfering signal is offset from the received signal. Moreover, because the offset frequency 316 may vary directly with the channel bandwidth 314, the threshold 322 may also vary directly with the channel bandwidth 314.

Figure 22:
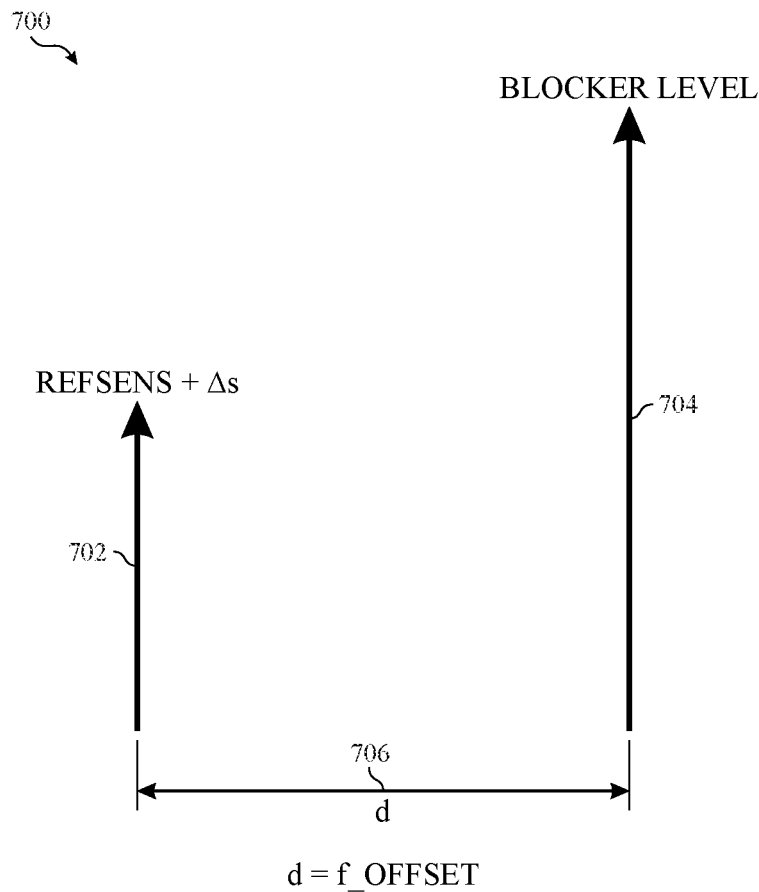
FIG. 22 is a graphical representation of an inverse relationship between a frequency at which an interfering signal is offset (e.g., an offset frequency) from a center frequency of a channel of a received signal, according to embodiments of the present disclosure.

Accordingly, in embodiments where the interfering signal is closer in frequency to the received signal/channel 302, the threshold 322 may be relaxed (e.g., increased) due to the greater effect of interference by the interfering signal. In embodiments where the interfering signal is farther in frequency from the received signal/channel 302, the threshold 322 may be decreased due to the lesser effect of interference by the interfering signal. This is illustrated in FIG. 22, which is a graphical representation of an inverse relationship 700 between a frequency 706 at which an interfering signal 704 is offset (e.g., an offset frequency) from a center frequency 702 of a channel of a received signal, according to embodiments of the present disclosure. For example, when compared to the ETSI standard 320 of FIG. 13 that has an offset frequency of 5 MHz and a threshold 322 of 1 dB, if the offset frequency decreases (e.g., is less than 5 MHz), then the threshold may increase (e.g., be greater than 1 dB) due to the interfering signal being closer to the received signal. On the other hand, if the offset frequency increases (e.g., is greater than 5 MHz), then the threshold may decrease (e.g., be less than 1 dB) due to the interfering signal being closer to the received signal.

As such, the threshold in FIG. 22 is denoted as REFSENS+Δs, where Δs may indicate a "signal relaxation" (e.g., in dB) that modifies (e.g., positively or negatively) the threshold noise level of a received signal, and where REFSENS serves as a base reference value. In particular, Δs may inversely vary with respect to how far (e.g., shown as 'd' or the offset frequency ("f offset")) the interfering signal is offset from the desired signal and/or a channel of the desired signal. Δs may be any suitable value (e.g., between 0 and 100 dB, 0 and 50 dB, 0 and 20 dB, and so on). For example, in a worst case scenario (e.g., where the interfering signal is near or at the received signal and/or the channel of the received signal, such that the offset frequency is near or approximately 0 MHz), the Δs may be approximately 10 dB to 15 dB (e.g., such that the threshold noise level of the received signal is approximately REFSENS+10 dB to REFSENS+15 dB). As another example, in a best case scenario (e.g., such that the offset frequency becomes large and/or approaches infinity), the Δs may be near or approximately 0 dB (e.g., such that the threshold noise level of the received signal is approximately or approaches REFSENS).

As a particular example, for a channel bandwidth (e.g., of a received signal) of 10 MHz, the channel-bandwidth-dependent narrowband blocking scheme 400 of FIG. 15, the offset frequency of an interfering signal from a center frequency of a channel having a received signal is 10 MHz. For the same channel bandwidth of 10 MHz, the narrowband blocking scheme 500 based on the 4G/LTE narrowband blocking specification of FIG. 17, the offset frequency is 5.2125 MHz. The narrowband blocking scheme using the 5G/NR narrowband blocking specification of FIG. 20 provides an offset frequency of 5.3175 MHz for the same channel bandwidth. Accordingly, among the three schemes 400, 500, 600 the threshold noise level of the received signal may be the least for the channel-bandwidth-dependent narrowband blocking scheme 400 of FIG. 15 (e.g., the Δs will be the least), and may be the largest for the 5G/NR narrowband blocking specification of FIG. 20 (e.g., Δs will be the greatest), with the threshold noise level of the narrowband blocking scheme 500 based on the 4G/LTE narrowband blocking specification of FIG. 17 being between the two (e.g., Δs will be between the two Δs's). In this manner, the present disclosure provides techniques for scaling the noise tolerance of a received signal based on a frequency that an interfering signal is offset from the received signal.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. User equipment, comprising:
one or more antennas;
receive circuitry coupled to the one or more antennas; and
at least one processor communicatively coupled to the receive circuitry, the at least one processor configured to
cause the receive circuitry to receive system information from a terrestrial communication node,
determine that the system information comprises a network signaling value that indicates a regional regulation or standard,
configure the receive circuitry to conform to an adjacent channel selectivity condition of the regional regulation or standard, an in-band blocking condition of the regional regulation or standard, or both, and
cause the receive circuitry configured to conform to the adjacent channel selectivity condition of the regional regulation or standard, the in-band blocking condition of the regional regulation or standard, or both, to receive data from a non-terrestrial communication node.

2. The user equipment of claim 1, wherein the at least one processor is configured to cause the receive circuitry to receive the data from the non-terrestrial communication node on a frequency range of between 1518 to 1559 megahertz, between 1613.8 to 1626.5 megahertz, between 2170 to 2200 megahertz, or between 2483.5 to 2500 megahertz.

3. The user equipment of claim 1, wherein the regional regulation or standard comprises a European Telecommunications Standards Institute standard.

4. The user equipment of claim 1, wherein the at least one processor is configured to conform to the adjacent channel selectivity condition of the regional regulation or standard, the adjacent channel selectivity condition of the regional standard comprising a performance degradation of the receive circuitry not exceeding one half decibel milliwatt when receiving a signal on a first channel having a first center frequency and an interfering signal having a power level of 12 decibel milliwatts greater than a power level of the signal is present on a second channel having a second center frequency that is a bandwidth of the first channel greater than the first center frequency of the first channel.

5. The user equipment of claim 1, wherein the at least one processor is configured to conform to the in-band blocking condition of the regional regulation or standard, the in-band blocking condition of the regional regulation or standard comprising a performance degradation of the receive circuitry not exceeding one decibel milliwatt when
receiving a signal on a channel having a channel lower bound, a channel higher bound, and a center frequency,
a first interfering signal having a power level of −40 decibel milliwatts or greater is present at a first frequency range having a first lower bound that is ten megahertz less than the channel lower bound and a first higher bound that is five megahertz less than the center frequency, and
a second interfering signal having a power level of −40 decibel milliwatts or greater is present at a second frequency range having a second lower bound that is ten megahertz greater than the channel higher bound and a second higher bound that is five megahertz greater than the center frequency.

6. The user equipment of claim 5, wherein a difference between the channel lower bound and the channel higher bound is five megahertz.

7. The user equipment of claim 1, wherein the at least one processor is configured to
cause the receive circuitry to receive additional system information from the terrestrial communication node, determine that the additional system information does not comprise the network signaling value that indicates the regional regulation or standard, and cause the receive circuitry to receive data from the non-terrestrial communication node without configuring the receive circuitry to conform to any adjacent channel selectivity condition or any in-band blocking condition.

8. A method, comprising:

detecting, via a receiver of user equipment, a terrestrial communication node;

synchronizing, via at least one processor of the user equipment, to the terrestrial communication node;

causing, via the at least one processor, the receiver to receive system information facilitating communication with a non-terrestrial communication node from the terrestrial communication node;

configuring, via the at least one processor, the receiver to have less than or equal a threshold power of performance degradation when receiving a signal on a channel having a bandwidth and a center frequency, and an interfering signal having a power level is present at a first frequency that is a bandwidth greater than the center frequency, and receiving, using the receiver as configured, data from the non-terrestrial communication node.

9. The method of claim 8, comprising configuring, via the at least one processor, the receiver to receive the data from the non-terrestrial communication node on a frequency range of between 1518 to 1559 megahertz, between 1613.8 to 1626.5 megahertz, between 2170 to 2200 megahertz, or between 2483.5 to 2500 megahertz.

10. The method of claim 8, wherein the threshold power of performance degradation is one-half decibel milliwatts above a reference sensitivity power level.

11. The method of claim 10, wherein the reference sensitivity power level comprises a minimum input power of the receiver.

12. The method of claim 11, wherein the terrestrial communication node comprises a base station.

13. The method of claim 8, wherein the power level of the interfering signal comprises a constant value greater than the threshold power of performance degradation.

14. The method of claim 13, wherein the constant value comprises 12 decibel milliwatts.

15. A communication node, comprising:

one or more antennas;

a receiver coupled to the one or more antennas;

a transmitter coupled to the one or more antennas; and one or more processors communicatively coupled to the transmitter and the receiver, the one or more processors configured to cause the transmitter and the receiver to detect user equipment, synchronize to the user equipment, receive, via the receiver, a request from the user equipment for an uplink frequency channel, a downlink frequency channel, or both, to communicate with a non-terrestrial communication node, and transmit, based on the request, system information to the user equipment, the system information comprising at least a network signaling value indicating a regional regulation or standard associated with communicating with the non-terrestrial communication node, wherein transmitting the system information comprising at least the network signaling value causes an additional one or more processors of the user equipment to configure an additional receiver of the user equipment to conform to an in-band blocking condition of the regional regulation or standard.

16. The communication node of claim 15, wherein the regional regulation or standard comprises a European Telecommunications Standards Institute standard.

17. The communication node of claim 15, wherein the in-band blocking condition comprises preventing noise within a channel from exceeding a noise tolerance level threshold when an interfering signal is in a range comprising a value less than a lower edge of an operating band of a desired signal and the value greater than an upper edge of the operating band of the desired signal.

18. The communication node of claim 17, wherein the value comprises five megahertz.

19. The communication node of claim 15, wherein the one or more processors are configured to cause the additional one or more processors of the user equipment to configure the additional receiver of the user equipment by performing power backoff, filtering techniques, or both.

20. The communication node of claim 15, wherein the additional one or more processors of the user equipment are configured to, in response to determining that the system information does not comprise the network signaling value that indicates the regional regulation or standard, cause the additional receiver of the user equipment to receive data from the non-terrestrial communication node, the additional receiver of the user equipment not being configured to conform to any in-band blocking condition.

* * * * *